US012254855B2

(12) United States Patent
Bosch Vicente et al.

(10) Patent No.: US 12,254,855 B2
(45) Date of Patent: Mar. 18, 2025

(54) METHOD, SYSTEM, AND COMPUTER-READABLE MEDIUM FOR CREATING SONG MASHUPS

(71) Applicant: Spotify AB, Stockholm (SE)

(72) Inventors: Juan José Bosch Vicente, Paris (FR); Youn Jin Kim, Brooklyn, NY (US); Peter Milan Thomson Sobot, Brooklyn, NY (US); Angus William Sackfield, Brooklyn, NY (US)

(73) Assignee: Spotify AB, Stockholm (SE)

( * ) Notice: Subject to any disclaimer, the term of this patent is extended or adjusted under 35 U.S.C. 154(b) by 182 days.

(21) Appl. No.: 17/930,933

(22) Filed: Sep. 9, 2022

(65) Prior Publication Data

US 2023/0075074 A1 Mar. 9, 2023

Related U.S. Application Data

(63) Continuation of application No. 16/728,953, filed on Dec. 27, 2019, now Pat. No. 11,475,867.

(51) Int. Cl.
*G10H 1/00* (2006.01)

(52) U.S. Cl.
CPC ..... *G10H 1/0008* (2013.01); *G10H 2210/056* (2013.01); *G10H 2210/076* (2013.01);
(Continued)

(58) Field of Classification Search
CPC ................. G10H 1/0025; G10H 1/361; G10H 2240/325; G10H 2210/056;
(Continued)

(56) References Cited

U.S. PATENT DOCUMENTS 8,258,390 B1 * 9/2012 Gossweiler ........... G06F 16/639 84/602
8,660,845 B1 * 2/2014 Sodeifi ................ G10L 21/0272 704/251
(Continued)

FOREIGN PATENT DOCUMENTS

AU 2020432954 A1 * 3/2022 ............. G06F 1/165
CN 108022604 5/2018
(Continued)

OTHER PUBLICATIONS

"Nearest Neighbour Algorithm", found at Wikipedia.org, last edited Mar. 10, 2020. Available at: https://en.wikipedia.org/wiki/Nearest_neighbour_algorithm.
(Continued)

*Primary Examiner* — Christina M Schreiber
(74) *Attorney, Agent, or Firm* — Morgan, Lewis & Bockius LLP

(57) ABSTRACT

A system, method and computer product for combining audio tracks. In one example embodiment herein, the method comprises determining at least one music track that is musically compatible with a base music track, aligning those tracks in time, and combining the tracks. In one example embodiment herein, the tracks may be music tracks of different songs, the base music track can be an instrumental accompaniment track, and the at least one music track can be a vocal track. Also in one example embodiment herein, the determining is based on musical characteristics associated with at least one of the tracks, such as an acoustic feature vector distance between tracks, a likelihood of at least one track including a vocal component, a tempo, or musical key. Also, determining of musical compatibility can include determining at least one of a vertical musical com-
(Continued)

patibility or a horizontal musical compatibility among tracks.

20 Claims, 26 Drawing Sheets

(52) U.S. Cl.
CPC . *G10H 2210/081* (2013.01); *G10H 2210/561* (2013.01); *G10H 2240/325* (2013.01)

(58) Field of Classification Search
CPC ....... G10H 2210/091; G10H 2210/061; G10H 2240/131; G10H 1/36; G10H 2210/031; G10H 2210/005; G10H 2210/105; G10H 2210/131; G10H 7/008; G10H 1/0091; G10H 1/08; G10H 2210/021; G10H 2210/136; G10H 2210/101; G10H 1/0008; G10H 2210/076; G10H 2210/081; G10H 2210/561
USPC ........................................................ 84/602
See application file for complete search history.

(56) References Cited

U.S. PATENT DOCUMENTS 8,855,334 B1 10/2014 Lavine et al.
9,257,954 B2 2/2016 Ball
9,280,313 B2 3/2016 Ball
9,286,877 B1 3/2016 Dabby
9,372,925 B2 6/2016 Ball
9,412,390 B1 8/2016 Chaudhary
9,798,974 B2 10/2017 Ball
9,852,745 B1 12/2017 Tootill
10,284,985 B1 5/2019 Chaudhary
10,446,126 B1 10/2019 Kaye
10,614,785 B1 * 4/2020 Dabby ................. G10H 1/0008
10,803,118 B2 * 10/2020 Jehan .................... G06F 16/635
11,475,867 B2 * 10/2022 Bosch Vicente ..... G10H 1/0008
2004/0027369 A1 * 2/2004 Kellock ............... G11B 27/034
2007/0083558 A1 4/2007 Martinez
2007/0292106 A1 12/2007 Finkelstein
2008/0271592 A1 11/2008 Beckford
2009/0038467 A1 * 2/2009 Brennan ................ G10H 1/368 84/609
2010/0305732 A1 * 12/2010 Serletic .................... G10H 7/00 715/727
2011/0112672 A1 5/2011 Brown
2013/0139057 A1 5/2013 Vlassopulos
2013/0170670 A1 * 7/2013 Casey .................. G10H 1/0025 381/119
2014/0018947 A1 1/2014 Ales
2014/0039891 A1 * 2/2014 Sodeifi ................ G10L 21/0272 704/E15.001
2014/0121797 A1 5/2014 Ales
2015/0067512 A1 3/2015 Roswell
2015/0302009 A1 10/2015 Henderson
2016/0012853 A1 1/2016 Cabanilla
2016/0042761 A1 2/2016 Motta
2016/0239876 A1 8/2016 Ales
2016/0372095 A1 12/2016 Lyske
2016/0372096 A1 12/2016 Lyske
2017/0214963 A1 7/2017 Di Franco
2018/0181730 A1 * 6/2018 Lyske ..................... G06F 21/16
2018/0374462 A1 12/2018 Steinwedel
2019/0043528 A1 2/2019 Humphrey
2019/0066641 A1 * 2/2019 Nazer ................... G06F 40/279
2019/0066643 A1 2/2019 Packouz
2019/0378482 A1 12/2019 Vorobyev
2020/0042879 A1 2/2020 Jansson
2020/0043517 A1 2/2020 Jansson
2020/0043518 A1 2/2020 Jansson
2020/0082019 A1 * 3/2020 Allen ............... H04N 21/45457
2020/0089705 A1 3/2020 Roswell
2020/0133620 A1 4/2020 Boumi
2020/0135176 A1 4/2020 Stoller
2020/0135237 A1 4/2020 Gauvin
2020/0410968 A1 12/2020 Mahdavi
2021/0090536 A1 * 3/2021 Pachet ................. G10H 1/0025
2021/0201863 A1 * 7/2021 Bosch Vicente ......... G10H 1/36
2021/0279030 A1 * 9/2021 Morsy .................. G10H 1/0091
2023/0057082 A1 * 2/2023 Fabbro .................... G10L 17/02
2023/0075074 A1 * 3/2023 Bosch Vicente ..... G10H 1/0008

FOREIGN PATENT DOCUMENTS

EP 3796306 A1 * 3/2021 ........... G06F 16/634
EP 3843083 A1 * 6/2021 ........... G10H 1/0008
WO WO-2006079813 A1 * 8/2006 ............. G10H 1/366
WO WO-2011103498 A2 * 8/2011 ........... G11B 27/034

OTHER PUBLICATIONS

C. Macas et al., "MixMash: A Visualisation System for Musical Mashup Creation", 22nd International Conference Information Visualisation (IV), Fisciano, pp. 471-477 (2018).
Davies et al. "AutoMashUpper: Automatic Creation of Multi-Song Music Mashups." IEEE/ACM Transactions on Audio, Speech, and Language Processing vol. 22, No. 12, (2014), pp. 1726-1737.
De Roure et al. "Music SOFA: An architecture for semantically informed recomposition of Digital Music Objects." SAAM, 2018, pp. 1-9.
Durand et al., "Downbeat Tracking with Multiple Features and Deep Neural Networks", 2015 IEEE International Conference on Acoustics, Speech and Signal Processing (ICASSP), Brisbane, QLD, pp. 409-413 (2015).
Durand et al., "Robust Downbeat Tracking Using an Ensemble of Convolutional Networks", IEEE/ACM Transactions on Audio, Speech, and Language Processing, vol. 25, Issue 1 (Jan. 2017).
Erik Bernhardsson, "Annoy", available at: github.com/spotify/annoy (2017). <last accessed Sep. 25, 2020>.
Erik Bernhardsson, "Nearest Neighbors and vector models—part 2—algorithms and data structures" (2015), available at: https://erikbern.com/2015/10/01/nearest-neighbors-and-vector-models-part-2-how-to-search-in-high-dimensional-spaces.html. <last accessed Sep. 25, 2020>.
European Search Report for EP Application No. 20213406.0 mailed May 31, 2021 (19 pages).
Jehan et al., "Analyzer Documentation", The Echo Nest analyzer developed by the Echo Nest of Somerville, MA (2011).
Jehan, Tristan. Creating music by listening. Diss. Massachusetts Institute of Technology, School of Architecture and Planning, Program in Media Arts and Sciences (2005).
M. Davies et al., "Improvasher: a real-time mashup system for live musical input", NIME (2014).
O. Nieto et al., "Systematic Exploration of Computational Music Structure Research, Music and Performance Arts Professions, Urban Initiative", Proceedings of the 17th International Society for Music Information Retrieval Conference (ISMIR), pp. 547-553 (Aug. 2016).
U.S. Appl. No. 16/521,756, filed Jul. 25, 2019, entitled "Automatic Isolation of Multiple Instruments From Musical Mixtures", by A. Jansson et al.
U.S. Appl. No. 15/974,767, filed May 8, 2018, entitled "Extracting Signals From Paired Recordings", by E. Humphrey et al. (hereinafter the "Humphrey application").
U.S. Appl. No. 16/055,870, filed Aug. 6, 2018, entitled "Singing Voice Separation With Deep U-Net Convolutional Networks", by A. Jansson et al.
U.S. Appl. No. 16/165,498, filed Oct. 19, 2018, 2018, entitled "Singing Voice Separation With Deep U-Net Convolutional Networks", by A. Jansson.
U.S. Appl. No. 16/242,525, filed Jan. 8, 2019, entitled "Singing Voice Separation With Deep U-Net Convolutional Networks", by A. Jansson et al.

(56) References Cited

OTHER PUBLICATIONS

Van den Oord, Aaron, Sander Dieleman, and Benjamin Schrauwen. "Deep content-based music recommendation." Advances in neural information processing systems (2013).

* cited by examiner

METHOD, SYSTEM, AND COMPUTER-READABLE MEDIUM FOR CREATING SONG MASHUPS

CROSS-REFERENCE TO RELATED APPLICATION(S)

This application is a Continuation of U.S. application Ser. No. 16/728,953, filed Dec. 27, 2019, and titled METHOD, SYSTEM, AND COMPUTER-READABLE MEDIUM FOR CREATING SONG MASHUPS, the disclosure of which is hereby incorporated by reference in its entirety. To the extend appropriate a claim of priority is made to the above-disclosed application.

BACKGROUND

The field of Music Information Retrieval (MIR) concerns itself, among other things, with the analysis of music in its many facets, such as melody, timbre or rhythm. Among those aspects, popular western commercial music (i.e., "pop" music) is arguably characterized by emphasizing mainly the melody and accompaniment aspects of music. For purposes of simplicity, the melody, or main musical melodic line, also referred to herein as a "foreground", and the accompaniment also is referred to herein as "background". Typically, in pop music the melody is sung, whereas the accompaniment often is performed by at least one or more instrumentalists, and possibly vocalists as well. Often, a singer delivers the lyrics, and the backing musicians provide harmony as well as genre and style cues.

A mashup is a fusion or mixture of disparate elements, and, in media, can include, in one example, a recording created by digitally synchronizing and combining background tracks with vocal tracks from two or more different songs (although other types of tracks can be "mashed-up" as well). A mashing up of musical recordings may involve removing vocals from one first musical track and replacing those vocals with vocals from at least one of second musically-compatible track, and/or adding vocals from the second track to the first track.

Listeners are more likely to enjoy mash-ups created from songs the users already know and like. Some commercially available websites enable users to listen to playlists suited to the users' tastes, based on state-of-the-art machine learning techniques. However, the art of personalizing musical tracks themselves to users' tastes has not been perfected.

Also, a mashup typically does not work to combine two entire songs, because most songs are much too different from each other for that to work well. Instead, a mashup typically starts with the instrumentals of one song as the foundation, and then the vocals are inserted into the instrumentals one short segment at a time. Any number of the vocal segments can be inserted into the instrumentals, and in any order that may be desired.

However, if two vocal and instrumental segments are not properly aligned, then they will not sound good together.

It is with respect to these and other general considerations that embodiments have been described. Also, although relatively specific problems have been discussed, it should be understood that the embodiments should not be limited to solving the specific problems identified in the background.

SUMMARY

The foregoing and other limitations are overcome by methods for determining musically compatible music tracks and segments and combining them, and by systems that operate in accordance with the methods, and by computer-readable storage media storing instructions which, when executed by one or more computer processors, cause the one or more computer processors to perform the methods.

One aspect includes a method for combining audio tracks, comprising: determining at least one music track that is musically compatible with a base music track; aligning the at least one music track and the base music track in time; separating the at least one music track into an accompaniment component and a vocal component; and adding the vocal component of the at least one music track to the base music track.

Another aspect includes the method according to the previous aspect, wherein the determining includes determining at least one segment of the at least one music track that is musically compatible with at least one segment of the base music track.

Another aspect includes the method according to any of the previous aspects, wherein the base music track and the at least one music track are music tracks of different songs.

Another aspect includes the method according to any of the previous aspects, wherein the determining is performed based on musical characteristics associated with at least one of the base music track and the at least one music track.

Another aspect includes the method according to any of the previous aspects, and further comprising: determining whether to keep a vocal component of the base music track, or replace the vocal component of the base music track with the vocal component of the at least one music track before adding the vocal component of the at least one music track to the base music track.

Another aspect includes the method according to any of the previous aspects, wherein the musical characteristics include at least one of an acoustic feature vector distance between tracks, a likelihood of at least one track including a vocal component, a tempo, or musical key.

Another aspect includes the method according to any of the previous aspects, wherein the base music track is an instrumental track and the at least one music track includes the accompaniment component and the vocal component.

Another aspect includes the method according to any of the previous aspects, wherein the at least one music track includes a plurality of music tracks, and the determining includes calculating a respective musical compatibility score between the base track and each of the plurality of music tracks.

Another aspect includes the method according to any of the previous aspects, and further comprising: transforming a musical key of at least one of the base track and a corresponding one of the plurality of music tracks, so that keys of the base track and the corresponding one of the plurality of music tracks are compatible.

Another aspect includes the method according to any of the previous aspects, wherein the determining includes determining at least one of: a vertical musical compatibility between segments of the base track and the at least one music track, and a horizontal musical compatibility among tracks.

Another aspect includes the method according to any of the previous aspects, wherein the vertical musical compatibility is based on at least one of a tempo compatibility, a harmonic compatibility, a loudness compatibility, vocal activity, beat stability, or a segment length.

Another aspect includes the method according to any of the previous aspects, wherein the at least one music track includes a plurality of music tracks, and wherein determining the horizontal musical compatibility includes determining at least one of: a distance between acoustic feature vectors among the plurality of music tracks, and a measure of a number of repetition of a segment of one of the plurality of music tracks being selected as a candidate for being mixed with the base track.

Another aspect includes the method according to any of the previous aspects, wherein the determining further includes determining a compatibility score based on a key distance score associated with at least one of the tracks, an acoustic feature vector distance associated with at least one of the tracks, the vertical musical compatibility, and the horizontal musical compatibility.

Another aspect includes the method according to any of the previous aspects, and further comprising: refining at least one boundary of a segment of the at least one music track.

Another aspect includes the method according to any of the previous aspects, wherein the refining includes adjusting the at least one boundary to a downbeat temporal location.

Another aspect includes the method according to any of the previous aspects, and further comprising: determining a first beat before the adjusted at least one boundary in which a likelihood of containing vocals is lower that a predetermined threshold; and further refining the at least one boundary of the segment by moving the at least one boundary of the segment to a location of the first beat.

Another aspect includes the method according to any of the previous aspects, and further comprising: performing at least one of time-stretching, pitch shifting, applying a gain, fade in processing, or fade out processing to at least part of the at least one music track.

Another aspect includes the method according to any of the previous aspects, and further comprising: determining that at least one user has an affinity for at least one of the base music track or the at least one music track.

Another aspect includes the method according to any of the previous aspects, and further comprising: identifying music tracks for which a plurality of user have an affinity; and identifying those ones of the identified music tracks for which one of the plurality of users has an affinity, wherein at least one of the identified music tracks for which one of the plurality of users has an affinity is used as the base music track.

Another aspect includes the method according to any of the previous aspects, wherein at least another one of the identified music tracks for which one of the plurality of users has an affinity is used as the at least one music track.

Another aspect includes a system for combining audio tracks, comprising: a memory storing a computer program; and a computer processor, controllable by the computer program to perform a method comprising: determining at least one music track that is musically compatible with a base music track, based on musical characteristics associated with at least one of the base music track and the at least one music track; aligning the at least one music track and the base music track in time; separating the at least one music track into an accompaniment component and a vocal component; and adding the vocal component of the at least one music track to the base music track.

Another aspect includes the system according to the previous aspect, wherein the musical characteristics include at least one of an acoustic feature vector distance between tracks, a likelihood of at least one track including a vocal component, a tempo, or musical key.

Another aspect includes the system according to any of the previous aspects, wherein the determining includes determining at least one segment of the at least one music track that is musically compatible with at least one segment of the base music track.

Another aspect includes the system according to any of the previous aspects, wherein the method further comprises transforming a musical key of at least one of the base track and a corresponding one of the plurality of music tracks, so that keys of the base track and the corresponding one of the plurality of music tracks are compatible.

Another aspect includes the system according to any of the previous aspects, wherein the determining includes determining at least one of a vertical musical compatibility between segments of the base track and the at least one music track, or a horizontal musical compatibility among tracks.

Another aspect includes the system according to any of the previous aspects, wherein the vertical musical compatibility is based on at least one of a tempo compatibility, a harmonic compatibility, a loudness compatibility, vocal activity, beat stability, or a segment length.

Another aspect includes the system according to any of the previous aspects, wherein the at least one music track includes a plurality of music tracks, and wherein determining of the horizontal musical compatibility includes determining at least one of a distance between acoustic feature vectors among the plurality of music tracks, and a repetition of a segment of one of the plurality of music tracks being selected as a candidate for being mixed with the base track.

Another aspect includes the system according to any of the previous aspects, wherein the determining further includes determining a compatibility score based on a key distance score associated with at least one of the tracks, an acoustic feature vector distance associated with at least one of the tracks, the vertical musical compatibility, and the horizontal musical compatibility.

DETAILED DESCRIPTION

Figure 1:
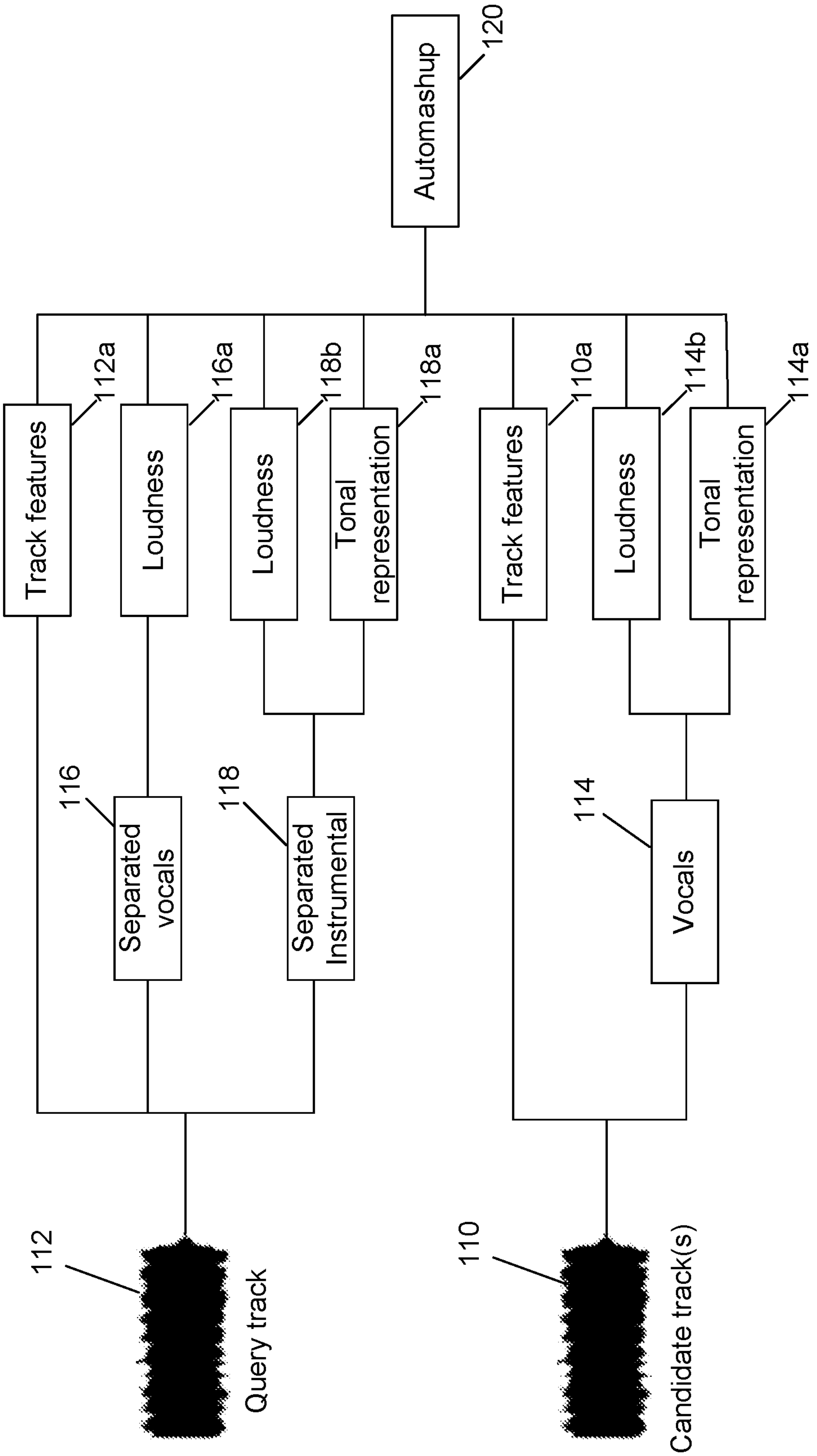
FIG. 1 shows a perspective representation of how an automashup can be performed based on a candidate track that includes vocal content, and a background or query track, according to an example embodiment herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Example aspects described herein can create new musical tracks that are a mashup of different, pre-existing audio tracks, such as, e.g., musical tracks. By example and without limitation, at least one component of a musical track, such as a vocal component, can be combined with at least part of another musical track, such as an instrumental or background track (also referred to as an "accompaniment track"), to form a mashup of those tracks. According to an example aspect herein, such a musical mashup can involve various procedures, including determining musical tracks that are musically compatible with one another, determining, from those tracks, segments that are compatible with one another, performing beat and downbeat alignment for the compatible segments, performing refinement of transitions between the segments, and mixing the segments of the tracks.

Examples Types of Information

Before describing the foregoing procedures in more detail, examples of at least some types of information that can be used in the procedures will first be described. Example aspects of the present application can employ various different types of information. For example, the example aspects can employ various types of audio signals or tracks, such as mixed original signals, i.e., signals that include both an accompaniment (e.g., background instrumental) component and a vocal component, wherein the accompaniment component includes instrumental content such as one or more types of musical instrument content (although it may include vocal content as well), and the vocal component includes vocal content. Each of the tracks may be in the form of, by example and without limitation, audio files for each of the tracks (e.g. mp3, way, or the like). Other types of tracks that can be employed include solely instrumental tracks (e.g., tracks that include only instrumental content, or only an instrumental component of a mixed original signal), and vocal tracks (e.g., tracks that include only vocal content, or only a vocal component of a mixed original signal). In one example embodiment herein, a 'track' may include an audio signal or recording of the applicable content, a file that includes an audio recording/signal of applicable content, a section of a medium (e.g., tape, wax, vinyl) on which a physical (or magnetic) track has been created due to a recording being made or pressed there, or the like. Also, for purposes of this description, the terms "background" and "accompaniment" are used interchangeably.

In one example embodiment herein, vocal and accompaniment/background (e.g., instrumental) tracks (or components) can be obtained from mixed, original tracks, although in other examples they may pre-exist and can be obtained from a database. In one example embodiment herein, vocal and instrumental tracks (or components) can be obtained from a mixed original track according to the method(s) described in the following U.S. patent application, although this example is not exclusive: U.S. patent application Ser. No. 16/055,870, filed Aug. 6, 2018, entitled “SINGING VOICE SEPARATION WITH DEEP U-NET CONVOLUTIONAL NETWORKS”, by A. Jansson et al. The foregoing Jansson application is hereby incorporated by reference in its entirety, as if set forth fully herein.

Example aspects of the present application also can employ song or track segmentation information for creating mashups. For example, song segmentation information can include the temporal positions of boundaries between sections of each track.

An additional type of information that can be employed to create mashups can include segment labelling information. Segment labelling information identifies (using, e.g., particular IDs) different types of track segments, and track segments may be labeled according to their similarity. By example and without limitation, segments that are included in a verse (which tends to be repeated) of a song may have a same label, segments that are included in a chorus of a song may have a same label, and the like. In one example, segments that are considered to be similar to one another (and which thus have a same label) are deemed to be within a same cluster.

Of course, the above examples given for how to obtain vocal and accompaniment tracks, song segmentation information, and segment labelling information, are intended to be representative in nature, and, in other examples, vocal and/or accompaniment tracks, song segmentation information, and/or segment labelling information may be obtained from any applicable source, or in any suitable manner known in the art.

Additional information that can be employed to create mashups also can include tempo(s) of each track, a representation of tonality of each track (e.g., a twelve-dimensional chroma vector), beat/downbeat positions in each track (e.g., temporal positions of beats and downbeats in each track), information about the presence of vocals (if any) in time in each track, energy of each of the segments in the vocal and accompaniment tracks, or the like. The foregoing types of information can be obtained from any applicable source, or in any suitable manner known in the art. In one example, at least some of the foregoing information is obtained for each track (including, e.g., separated tracks) using a commercially available audio analysis tool, such as the Echo Nest analyzer. In other examples, the aforementioned types of information may pre-exist and can be obtained from a database.

According to one example, determining information about the presence of vocals involves mining original-instrumental pairs from a catalogue of music content, extracting strong vocal activity signals between corresponding tracks, exploiting the signal(s) to train deep neural networks to detect singing voice, and recognizing the effects of this data source on resulting models. In other example embodiments herein, information (vx) about the presence of vocals can be obtained from loudness of a vocal track obtained from a mixed, original signal, such as, e.g., a vocal track obtained according the Jansson application identified above.

Additional information that can be employed to create mashups can include acoustic feature vector information, and loudness information (e.g., amplitude). An acoustic feature vector describes the acoustic and musical properties of a given recording. An acoustic feature vector can be created manually, by manually quantifying the amount of given properties, e.g. vibrato, distortion, presence of vocoder, energy, valence, etc. The vector can also be created automatically, such as by using the amplitude of the signal, the time-frequency progression, or more complex features.

Each of the above types of information associated with particular tracks and/or with particular segments of tracks, can be stored in a database in association with the corresponding tracks and/or segments. The database may be, by example and without limitation, one or more of main memory 1125, portable storage medium 1150, and mass storage device 1130 of the system 1100 of FIG. 20 to be described below, or the database can be external to that system 1100, in which case it can be accessed by the system 1100 by way of, for example, network 1120 and peripheral device(s) 1140. For purposes of this description, the various types of information are shown as information 1131 stored in mass storage device 1130 of FIG. 20, although of course the information 1131 can be stored in other storage devices as well, or in lieu of mass storage device 1130, as described above.

Example Representation

FIG. 1 shows an example flowchart representation of how an automashup can be performed based on a candidate track that includes vocal content, and a background or query track, according to an example embodiment herein. In this example, the algorithm to perform the automashup creates a music mashup by sequentially adding vocal segments of one or more track(s) (of one song) on top of one or more segments of a background track, (of, e.g., another song), and/or by replacing vocal content of one or more segments of a background track (of one song) that includes the vocal content, with vocal content of the one or more track(s) (of, e.g., another song). Inputs to the algorithm can include, by example, a background track (e.g., including instrumental or vocal/instrumental content) (also referred to herein as a “query track” or “base track”), such as track 112 of FIG. 1, and a (potentially large) set of vocal candidate tracks, including track 110 having vocal content, each of which may be obtained from the database and/or in accordance with the method(s) described in the Jansson application, for example.

In one example embodiment herein, with respect to tracks 110, 112, the content of track 112 is from a different song than the content from track(s) 110, although in other examples the content of at least some tracks 110, 112 may be from the same song(s). For purposes of this description, the track 110 also is referred to herein as a “target” or “candidate” track 110. Also, each track 110, 112 includes respective segments, wherein segments of the candidate or target track 110 are also referred to herein as “candidate segments” or “target segments”, and segments of the query track 112 also are referred to herein as “query segments”. FIG. **8*a* shows a representation of a query track 112 having query segments 122, and candidate tracks 110 having candidate segments 124, based on which a mashability score 126 can be determined, according to an example aspect herein. The query segments 122 may include, by example and without limitation, instrumental or vocal/instrumental content, (e.g., of one song), and the candidate segments 124 may include, by example and without limitation, at least vocal content (of, e.g., at least one other song). Of course, the scope of the invention is not limited to these examples only, and the segments 122, 124** may include other types of content arrangements than those described above.

As represented in FIG. 1, the candidate track includes vocals 114 and the query track 112 includes separated vocal component/track 116 and separated instrumental component/track 118. In addition, additional track features 112*a* of the query track and additional track features 110*a* of the candidate track 110 are also identified from the query track 112 and candidate track 110. Track features 110*a* and 112*a* can include, for example, acoustic features (such as tempo, beat, musical key, likelihood of including vocals, and other features as described herein). Information regarding loudness 114*b* and tonality (e.g., tonal representation) 114*a* are obtained based on the vocal component 114 of the candidate track 110. Information regarding loudness 118*b* and tonality (e.g., tonal representation) 118*a* based on the separated instrumental component/track 118 and information regarding at least loudness 116*a* based on the separated vocal component/track 116 of the query track 112 are obtained.

The information represented by reference numerals 110*a*, 112*a*, 114, 114*a*, 114*b*, 116, 116*a*, 118, 118*a* and 118*b* is employed in an algorithm to perform an automashup that results in a mashup track 120, according to an example aspect herein. It should be note that, although candidate track 110 is shown and described above for convenience as including instrumental content, in some cases it also may include at least some vocal content as well, depending on the application of interest.

S-Keep, S-Subs, and S_Add Segments

A procedure 200 according to an example aspect herein, for determining whether individual segments of a query track (e.g., an accompaniment track) 112 under consideration are to be kept, or have content (e.g., vocal content) replaced or added thereto from one or more candidate (e.g., vocal) tracks 110, during an automashup of the tracks 110, 112, will now be described, with reference to FIGS. 2*a* and 2*b*. In one example embodiment herein, and as described above, the content of query track 112 used in the procedure 200 is from a different song than the content from the one or more candidate track(s) 110 used in the procedure 200, although in other examples the content of at least some tracks 110, 112 used in the procedure 200 may be from the same song(s). Also, although at least some parts of the below description may be described in the context of procedure 200 being performed for one query track 112 and one candidate track 110, the scope of the invention is not so limited, and the procedure can involve more than two tracks, such as, by example, a query track 112 and a plurality of candidate tracks 110, wherein each track 112, 110 may include content from different songs (or, in other examples, at least some of the same songs.

In one example embodiment herein, the procedure 200 employs at least some of the various types of information 1131 as described above, including, without limitation, information about the likelihood of a segment containing vocals (vx) (e.g., at beats of segments), downbeat positions, song segmentation information (including start and end positions of segments), and segment labelling information (e.g., IDs), and the like. As described above, each type of information may be stored in a database in association with corresponding tracks 110, 112 and/or segments 122, 124 associated with the information 1131.

Figure 2A:
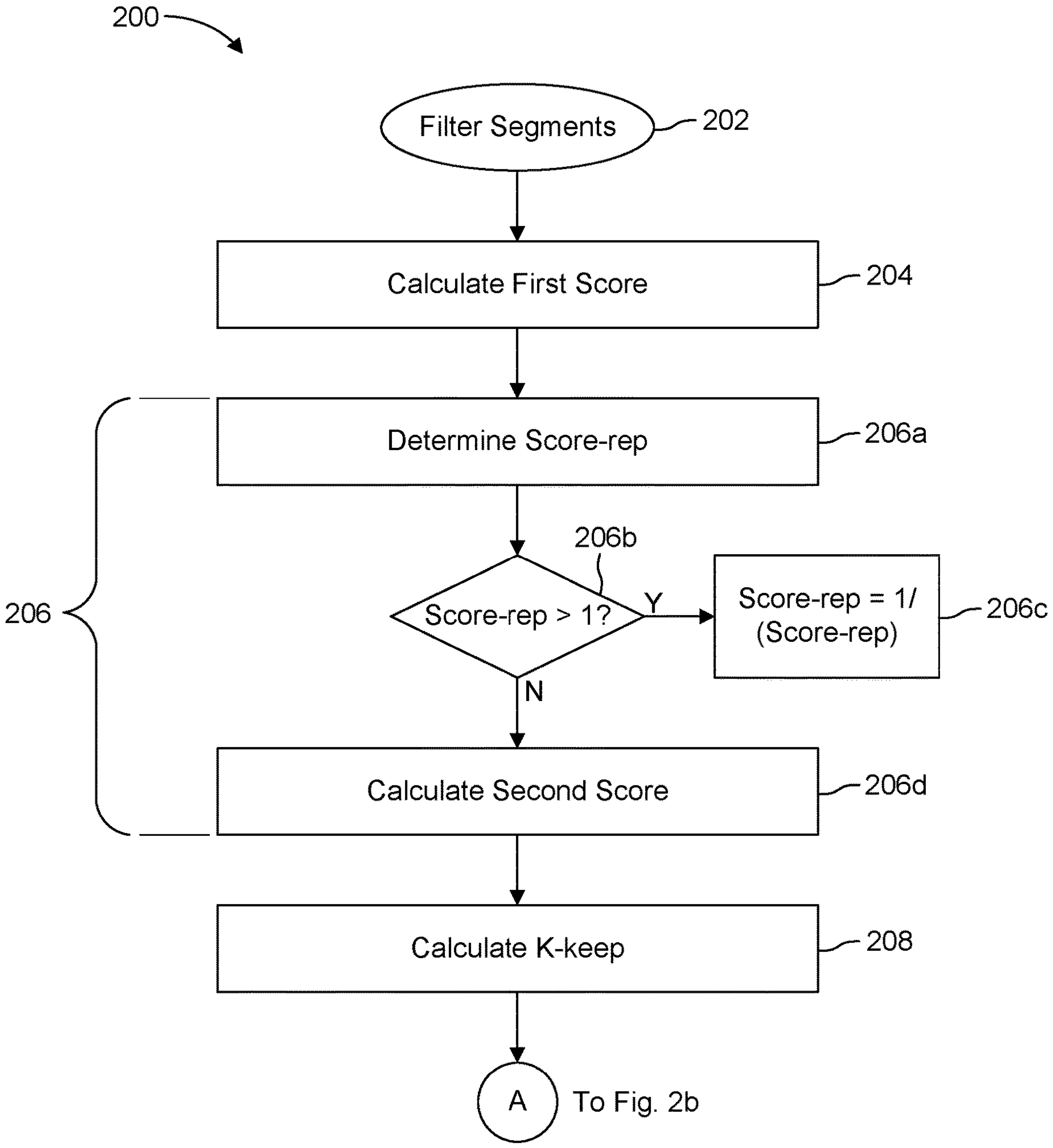
FIG. 2, (including FIGS. 2*a* and 2*b*) is a flow diagram of a procedure for determining whether individual segments of a query track (e.g., a background track) are to be kept (S_keep), or have content (e.g., vocal content) replaced (S_subs) or added thereto (S_add) from one or more candidate (e.g., vocal) tracks, during an automashup of the tracks, according to an example aspect herein.

Referring to FIG. 2*a*, query segments 122 of the query track 112 that have less than a predetermined number of bars (e.g., eight bars) are filtered out and discarded (step 202), while others are maintained. In steps 204 and 206 scores (e.g., two scores) are determined for a first one of the maintained query segments 122. More particularly, in step 204, a first score (K_keep_vx) is calculated by determining, for all beats of the currently considered query segment 122, a mean value of the probability of the segment 122 containing vocals at each beat, based on the information about the likelihood of the segment 122 containing vocals (vx) at those beats, wherein in one example embodiment, that information may be obtained from the database. In step 206, which includes sub-steps 206*a* to 206*d*, a second score (K_keep_rep) is determined. More particularly, in sub-step 206*a*, given a predetermined ideal number of repetitions (e.g., two) (i.e., an amount of segments of query track 112 (or, in another example embodiment, of a candidate track 110) having the same segment ID) represented by the term "ideal_num_reps", an intermediate value ("score_rep") is determined according to the following formula (F1):

$$\text{score\_rep}=N\text{repet}/(\text{ideal\_num\_reps}) \quad \text{(F1)}$$

where Nrepet represents a number of segments 122 of the query track 112 that have the same segment labelling information (e.g., the same segment ID) as the currently considered query segment 122, score_rep represents the intermediate score, and ideal_num_reps represents the predetermined ideal number of repetitions.

If the value of score_rep is greater than value '1' ("Yes" in sub-step 206*b*), then in sub-step 206*c*, the value of score_rep is set as follows, according to formula (F2):

$$\text{score\_rep}=1/(\text{score\_rep}) \quad \text{(F2).}$$

On the other hand, if the value of score_rep is less than or equal to value '1' ("No" in sub-step 206*b*), then the value of score_rep that was determined in step 206*a* is maintained.

In either case, after sub_step 206*b*, control passes to sub-step 206*d*, where a value for the second score (K_keep_rep) is determined according to the following formula (F3):

$$K\text{\_keep\_rep}=\text{score\_rep} \quad \text{(F3).}$$

Then, control passes to step 208 where a value of a "keep score" K_keep is determined according to the following formula (F3'), for the segment 122 under consideration:

$$K\text{\_keep}=K\text{\_keep\_rep}*K\text{\_keep\_}vx \quad \text{(F3').}$$

Figure 2B:
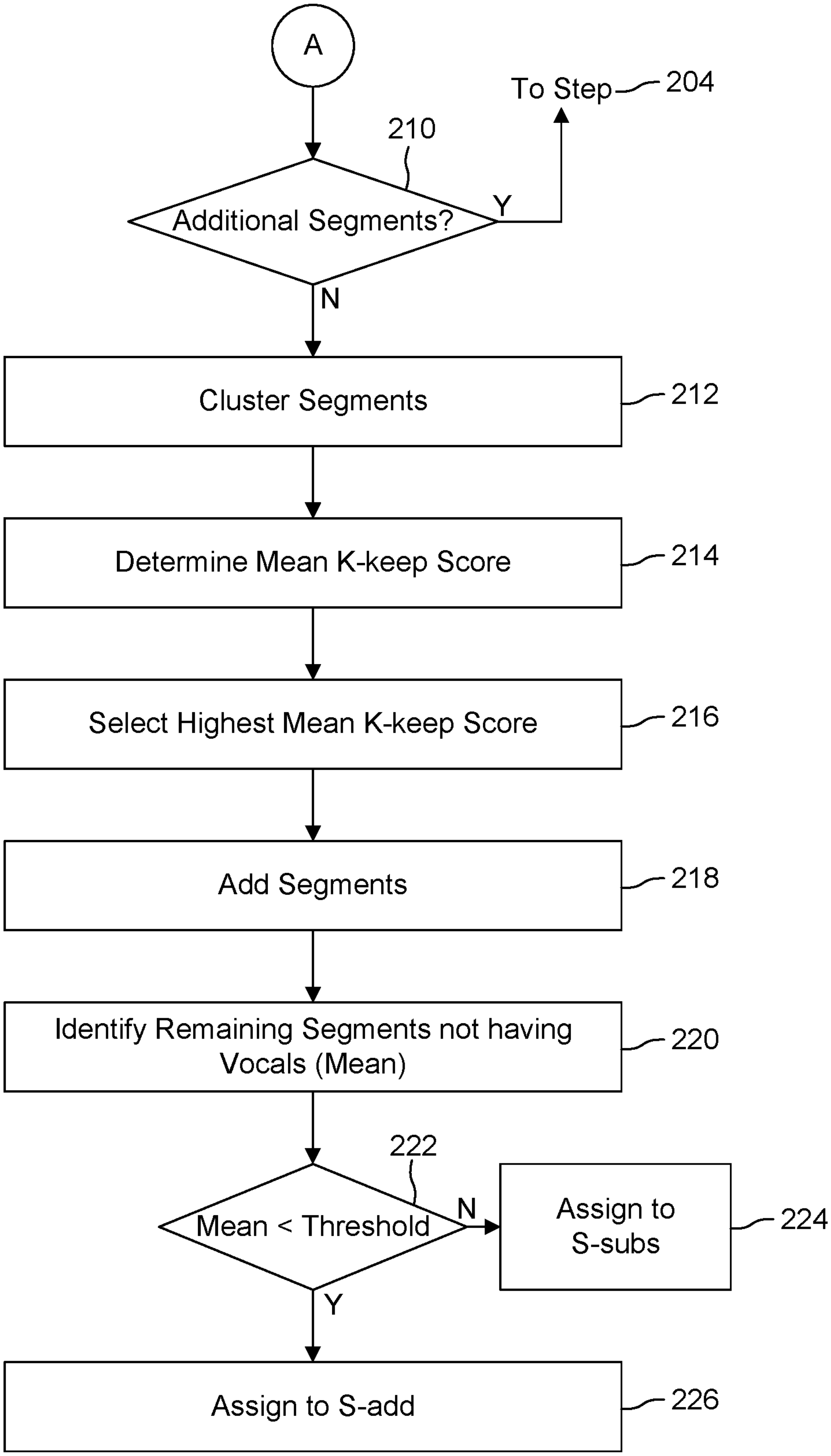

Next, control passes via connector A to step 210 of FIG. 2*b*, where a determination is made as to whether the query track 112 includes additional query segments 122 that have not yet been considered. If "Yes" in step 210, then control passes back to step 204 where the procedure 200 continues in the above described manner, but for a next segment 122 in a sequence of segments 122 of the query track 112. If "No" in step 210, then control passes to step 212 where any segments 122 that were processed as described above (in steps 204 to 208) are clustered according to their IDs. In particular, according to one example embodiment herein, step 212 includes determining labels (e.g., IDs) (e.g., based on segment labelling information among information 1131) of those segments 122, and then clustering together segments 122 having the same labels. As a result of step 212, there may be as many clusters determined as there are unique segment labels (IDs).

In a next step 214, a mean K_keep score for each of the clusters (i.e., a mean of the K_keep score values for segments 122 from each respective cluster) is determined, and then control passes to step 216, where a set of segments 122 from the cluster with the greatest determined mean K_keep score is selected. Then, in step 218, it is determined which segments 122 have a length of less than a predetermined number of bars (e.g., 4 bars), and those segments are added to the selected set of segments, according to one example embodiment herein, to provide a combined set of segments 122. The combined set of segments 122 resulting from step 218 is deemed to be assigned to "S-keep", and thus each segment 122 of the combined set will be maintained (kept) with its original content, whether the content includes vocal content, instrumental content, or both.

To determine segments "(S_subs)" for which the original vocal content included therein will be replaced, and to determine segments (S_add) to which vocals from other songs will be added (versus replaced), the remaining set of segments 122 that had not been previously assigned to S_keep are employed. More specifically, to determine segments S_add, those ones of the remaining segments 122 (i.e., those not resulting from step 218) that are deemed to not contain vocal content are identified. In one example embodiment herein, identification of such segments 122 is performed as described in the Humphrey application (and/or the identification may be based on information 1131 stored in the database), and can include determining a mean probability that respective ones of the segments 122 contain vocal content (at each of the beats) (step 220). Then, for each such segment 122, a determination is made as to whether the mean determined therefor is lower than a predetermined threshold (e.g., 0.1) in step 222. If the mean for respective ones of those segments 122 is not lower than the predetermined threshold (i.e., if the mean equals or exceeds the predetermined threshold) ("No" in step 222), then those respective segments 122 are deemed to be segments (S_subs) for which the original vocals thereof will be replaced (i.e., each such segment is assigned to "S_subs") (step 224). If the mean calculated for respective ones of the segments 122 identified in step 220 is lower than the predetermined threshold ("Yes" in step 222), then those segments 122 are deemed to be segments (S_add) to which vocals from other, candidate tracks 110 will be added (i.e., each such segment is assigned to "S_add") (step 226).

AutoMashup Procedure for S_Subs and S-Add

Figure 3:
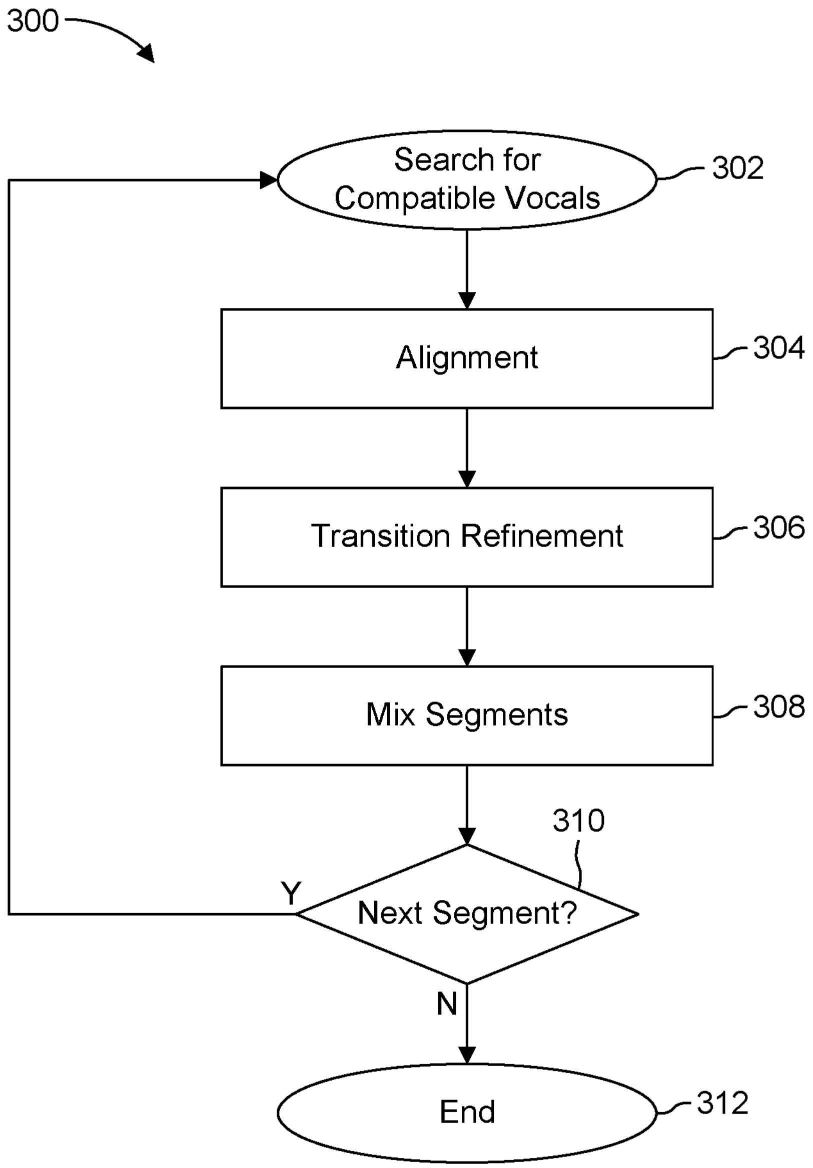
FIG. 3 is a flow diagram of a procedure for performing automashups using segments (S_subs) and (S_add), according to an example aspect herein.

A procedure 300 to perform automashups using the segments (S_subs) and (S_add), according to an example aspect herein, will now be described, with reference to FIG. 3. The procedure 300 is performed for each respective segment 122 assigned to S_subs and S_add. In step 302, a search is performed to find/identify one or more compatible candidate (e.g., vocal) segments 124 for a first segment 122 from among the segments 122 that were assigned to S_subs and S_add. In one example embodiment herein, step 302 involves performing a song suggester procedure and a segment suggestion procedure, and computing one or more mashability scores for the segment 122 (of the query track 112 under consideration) and segments 124 from candidate tracks 110. In one example embodiment herein, the song suggester procedure is performed in accordance with procedure 400 of FIG. 4 to be described below, and the segment suggestion procedure is performed in accordance with procedure 1800 of FIG. 18 to be described below. Also, in one example embodiment herein, the mashability score is performed as will be described below.

Then, in step 304, beat and downbeat alignment is performed for the segment 122 under consideration and the candidate (e.g., vocal) segment(s) 124 determined to be compatible in step 302. In step 306, transition refinement is performed for the segment 112 under consideration and/or the candidate segment(s) 124 aligned in step 304, based on, for example, segmentation information, beat and downbeat information, and voicing information, such as that stored among information 1131 in association with the tracks 110, 112 and/or segments 122, 124 in the database. Then, in step 308, those segments 122, 124 are mixed. In one example, mixing includes a procedure involving time-stretching and pitch shifting using, for example, pysox or a library such as elastique. By example, in a case where that segment 122 was previously assigned to S_subs, mixing can include replacing vocal content of that segment 122, with vocal content of the aligned segment 124. Also by example, in a case where the segment 122 was previously assigned to S_add, mixing can include adding vocal content of the segment 124 to the segment 122.

Figure 8A:
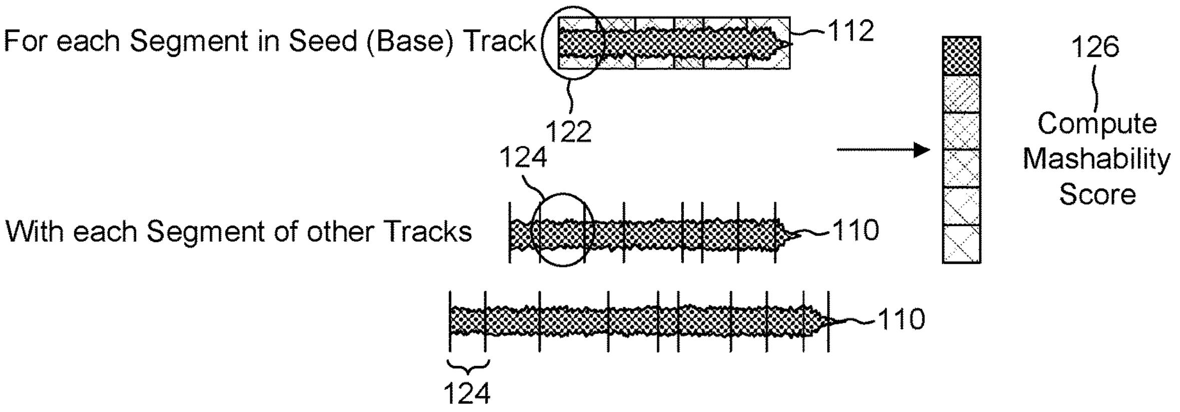
FIG. 8*a* shows a representation of a query track having query segments, and candidate tracks having candidate segments, based on which a segment mashability score can be determined.

In a next step 310, a determination is made as to whether a next segment 122 among segments (S_subs) and (S_add) exists in the query track 112, for being processed in the procedure 300. If "Yes' in step 310, then control passes back to step 302 where the procedure 300 is performed again for the next segment 122 of the track 112. If "No" in step 310, then the procedure ends in step 312. As such, the procedure 300 is performed (in one example embodiment) in sequential order, from a first segment 122 of the query track 112 until the last segment 122 of the query track 112. The procedure also can be performed multiple times, based on the query track 112 and multiple candidate tracks 110, such that a mashup is created based on multiple ones of the tracks 110. Also in a preferred embodiment herein, to reduce processing load and the amount of time required to perform procedure 300, the number of candidate tracks 110 that are employed can be reduced prior to the procedure 300, by selecting best options from among the candidate tracks 110. This is performed by determining a "song mashability score" (e.g., score 126 of FIG. 8*a*), which will be described in detail below.

As a result of the procedure 300, a mashup track 120 (FIG. 1) is provided based on the query track 112 and at least one candidate track 110 under consideration. The mashup track 120 includes, by example, one or more segments 122 that were assigned to S_keep, one or more other segments 122 having vocal content (from one or more candidate tracks 110) that was used to replace vocal content of an original version of those other segments 122 in step 308, and one or more further segments 122 having vocal content (from one or more candidate tracks 110) that was added to those further segments 122 in step 308. In the mashup track 120, beat positions in the query track 112 are mapped with corresponding beat positions of the candidate track(s) 110.

Song Suggester Procedure

Before describing how a song mashability score is determined, the song suggester procedure 400 according to an example aspect herein will first be described. In one example embodiment herein, the song suggester procedure 400 involves calculating a song mashability score defining song mashability. To do so, a number of different types of scores are determined or considered to determine song mashability, including, by example and without limitation, an acoustic feature vector distance, a likelihood of including vocals, closeness in tempo, and closeness in key.

An acoustic vector distance score is represented by "Ksong (acoustic)". In one example embodiment herein, an ideal normalized distance between tracks can be predetermined such that segments under evaluation are not too distant from one another in terms of acoustic distance. The smaller the distance between the query and candidate (e.g., vocal) tracks, the higher is the score. Of course, in other example embodiments herein, the ideal normalized distance need not be predetermined in that manner. Also, it is within the scope of the invention for the ideal normalized distance to be specified by a user, and/or the ideal normalized distance may be such that the segments under evaluation are not close in space (i.e., and therefore the segments may be from songs of different genres) to achieve a desired musical effect, for example.

Figure 4:
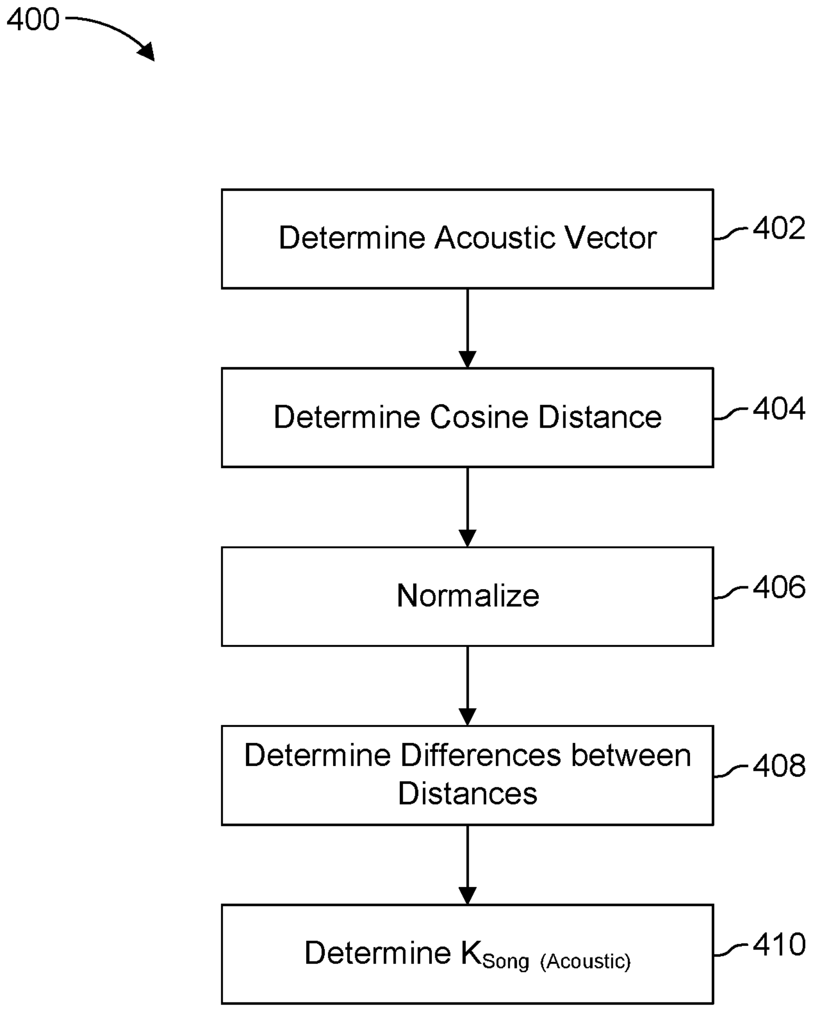
FIG. 4 is a flow diagram of a song suggester procedure according to an example embodiment herein.

In one example embodiment herein, an acoustic feature vector distance score Ksong(acoustic) is determined according to the procedure 400 of FIG. 4. In step 402, the acoustic vector of the original query track 112 under consideration (e.g., in procedure 300) is determined, without separation (query-mix_ac). In step 404, a cosine distance between query-mix_ac and all vectors of the candidate tracks 110 is determined. In one example embodiment herein, step 404 determines a respective vector of acoustic feature vector distance between the query track 112 and each candidate track 110, using a predetermined algorithm. The predetermined algorithm involves using random projections and building up a tree. At every intermediate node in the tree, a random hyperplane is selected, that divides the space into two subspaces. The hyperplane is chosen by sampling a plurality (e.g., two) of points from the subset and taking the hyperplane equidistant from them. The foregoing is performed k times to provide a forest of trees, wherein k is tuned as deemed needed to satisfy predetermined operating criteria, considering tradeoffs between precision and performance. In one example, a Hamming distance packs the data into 64-bit integers under the hood and uses built-in bit count primitives. All splits preferably are axis-aligned. A Dot Product distance reduces the provided vectors from dot (or "inner-product") space to a more query friendly cosine space.

In another example embodiment herein, the predetermined algorithm is the Annoy (Approximate Nearest Neighbors Oh Yeah) algorithm, which can be used to find nearest neighbors. An Annoy tree is a library with bindings for searching for points in space close to a particular query point. The Annoy tree can form file-based data structures that can be mapped into memory so that various processes may share the same data. In one example, and as described above, an Annoy algorithm builds up binary trees, wherein for each tree, all points are split recursively by random hyperplanes. A root of each tree is inserted into a priority queue. All trees are searched using the priority queue, until there are search_k candidates. Duplicate candidates are removed, a distance to candidates is computed, candidates are sorted by distance, and then top ones are returned.

In general, a nearest neighbor algorithm involves steps such as: (a) start on an arbitrary vertex as a current vertex, (b) find out a shortest edge connecting the current vertex with an unvisited vertex V, (c) set the current vertex to V, (d) mark V as visited, and (e) if all the vertices in domain are visited, then terminate. The sequence of the visited vertices is the output of the algorithm.

Referring again to FIG. 4, a next step 406 includes normalizing the vector of acoustic feature vector distance(s) determined in step 404 by its maximum value, to obtain normalized distance vector(s) (step 406), or, in other words, a resulting final vector of acoustic feature vector distances (Vdist), wherein, in one example embodiment, Vdist is within the interval [0,1].

Then, for a given candidate track 110 with index j, formula (F4) is performed in step 408 to determine a distance ("difference") between the final vector of acoustic feature vector distances (Vdist) and an ideal normalized distance:

$$\text{difference}=V\text{dist}[j]-\text{ideal\_norm\_distance} \qquad \text{(F4)},$$

where "Vdist[j]" is the final vector of acoustic feature vector distances for candidate track 110 with index j, and "ideal_norm_distance" is the ideal normalized distance. In one example embodiment herein, the ideal normalized distance ideal_norm_distance can be predetermined, and, in one example, is zero ('0'), to provide a higher score to acoustically similar songs.

A value of "Ksong(acoustic)" (the acoustic feature vector distance score) is then determined in step 410 according to the following formula (F5):

$$K\text{song(acoustic)}=\max(0.01,1-\text{abs(difference)}) \qquad \text{(F5)},$$

where "difference" is defined as in formula (F4).

In the foregoing manner, the acoustic feature vector score Ksong(acoustic) is determined.

As described above, another type of information that is used to determine a mashability score is information about the presence of vocals (if any) in time, or, in other words, information representing the likelihood that a segment in question contains vocals. As described above, information about the presence of vocals (if any) in time, for a candidate track 110, can be obtained according to the method described in the Humphrey application, although this example is not exclusive, and the information can be obtained from among the information 1131 stored in a database. For convenience, information representing the likelihood that a segment in question contains vocals is referred to herein as a "vocalness likelihood score".

In one example embodiment herein, a greater likelihood of a track segment including vocals means a greater score. Such a relationship can be useful in situations where, for example, users would like to search for tracks 110 which contain vocals. In another example scenario (e.g., a DJ wanting to mix together songs) the vocalness likelihood score may be ignored.

Figure 5:
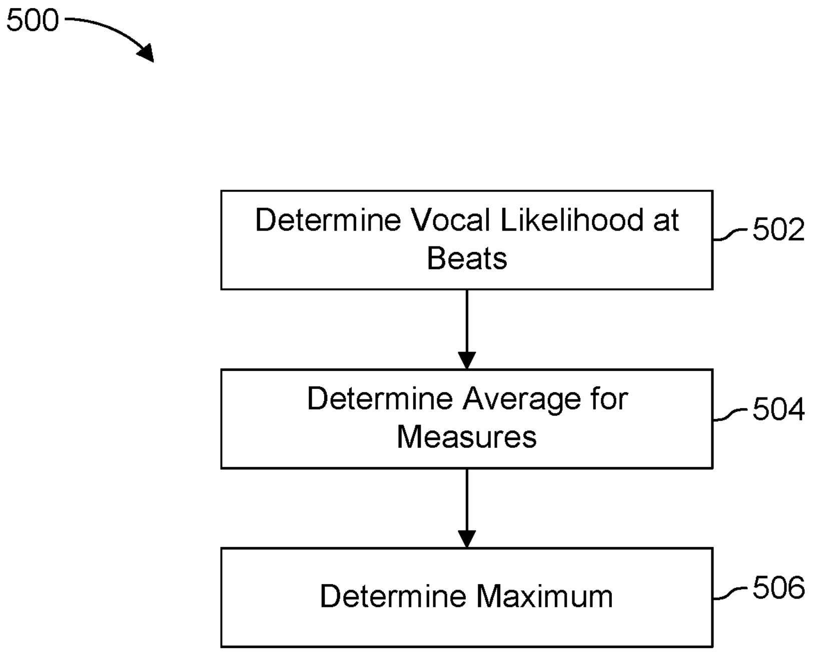
FIG. 5 is a flow diagram of a procedure for determining a likelihood that a track contains predetermined content, such as, for example, vocal content, according to an example embodiment herein.

In one example embodiment herein, a vocalness likelihood score can be determined according to procedure 500 of FIG. 5. In step 502 a likelihood of each beat of a candidate track 110 under consideration containing vocals, is determined. In one example embodiment, step 502 is performed in accordance with the procedure(s) described in the Humphrey application, or, in another example, step 502 can be performed based on a likelihood information obtained from among information 1131 in the database. Next, in step 504 an average of the likelihood determined in step 502 for each musical measure of the track 110, is determined. Next, in step 506 a maximum value among averages determined in step 504 for all measures is determined (and is represented by "Ksong(vocalness)"). Procedure 500 is performed for each candidate track 110.

Another type of information that is used to determine a mashability score is closeness in tempo. For determining a score for closeness in tempo, according to an example embodiment herein, that score, which is represented by "Ksong(tempo)", is determined according to the following formula (F6):

$$K\text{song(tempo)}=np\cdot\max([0.01,1-\text{abs}(\log 2(\text{tempo\_cand/tempo\_query})*K\text{\_tempo})]) \qquad \text{(F6)},$$

where tempo_cand and tempo_query are the tempi of the candidate and query tracks 110, 112, respectively (e.g., such tempi can be retrieved from the database), and K tempo is a factor to control the penalty of the difference between tempi. Tempo can be determined in many ways. One example includes: tempo=60/median (durations), where durations are the durations of the beats in a song. In one example embodiment herein, the closer the candidate and query tracks 110, 112, are in beats-per-minute (bpm), the higher is the score Ksong(tempo) (in a logarithmic scale).

Figure 8B:
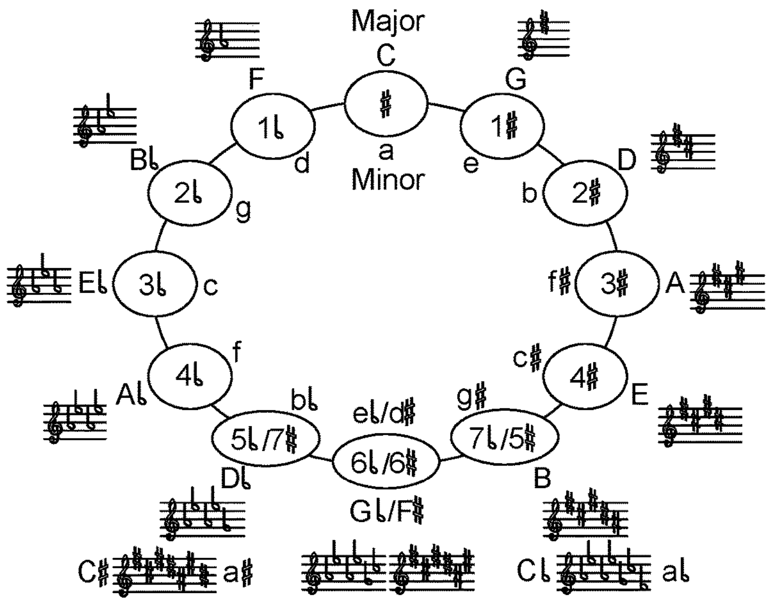
FIG. 8*b* shows a representation of a known cycle of fifths, representing how major and minor keys and semitones relate to one another in Western musical theory.
Figure 8C:
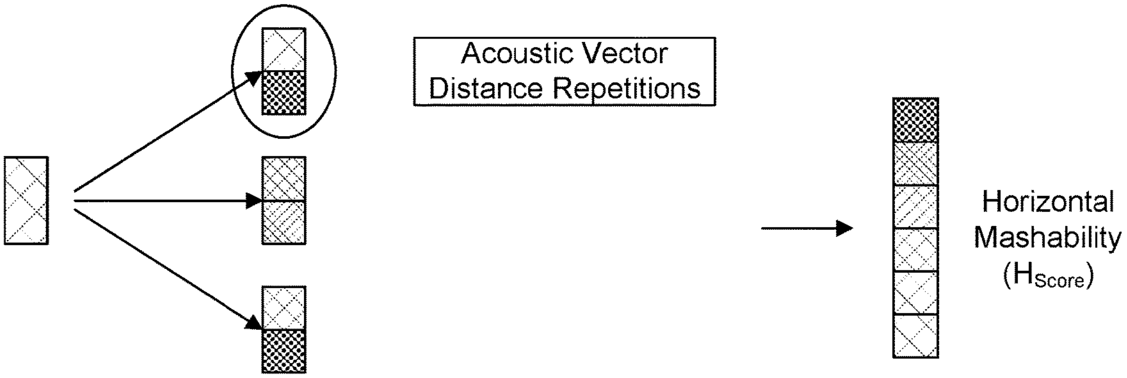
FIG. 8*c* represents determination of horizontal mashability based on an acoustic feature vector distance and an amount of repetitions of a given segment, according to an example embodiment herein.

Another type of information that is used to determine a mashability score is closeness in key, which is defined by a "closeness in key score" Ksong(key). The manner in which a closeness in key score Ksong(key) is determined according to an example embodiment herein, will now be described. The closeness in key score Ksong(key) measures how close together tracks 110, 112 are in terms of musical key. In one example embodiment herein, "closeness" in key is measured by way of a difference in semitones of keys of tracks 110, 112, although this example is non-limiting. Also in one example embodiment herein, the smaller the difference (in semitones) between the semitones of tracks 110, 112, then the greater is the score Ksong(key). FIG. 8*b* shows a representation of a known cycle of fifths, representing how major and minor keys and semitones relate to one another in Western musical theory.

Figure 6:
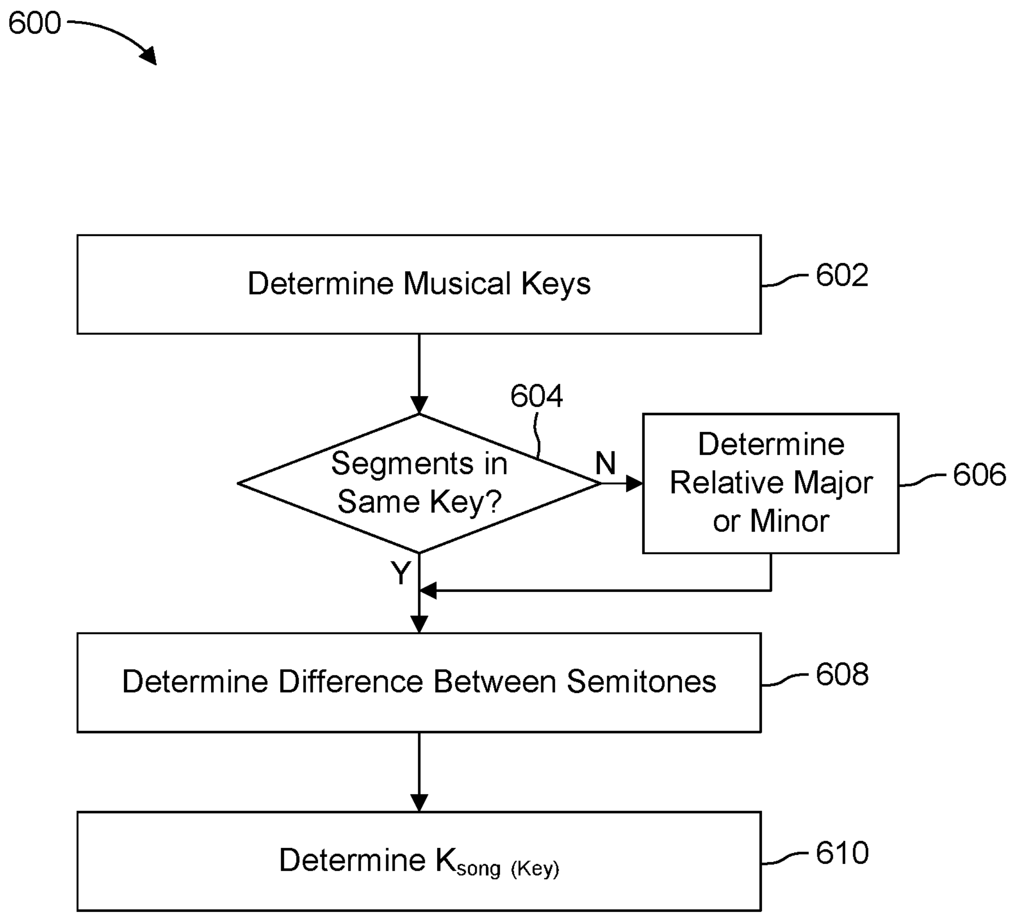
FIG. 6 is a flow diagram of a procedure for determining a closeness in key between audio tracks, according to an example embodiment herein.

FIG. 6 shows a procedure 600 for determining closeness in key, according to an example embodiment herein. In step 602, a determination of the key and of each track 110, 112 (and the pitch at each beat of segments of the tracks 110, 112) under consideration is made. The key and the pitch of a segment is determined using methods described in the Jehan reference discussed above. According to an example embodiment herein, if the tracks 110, 112 under consideration are determined to be in the same type of key (e.g., both are in a major key, or both are in a minor key) ("Yes" in step 604), then the keys determined in step 602 are passed to step 608 to calculate the score Ksong(key), in a manner as will be described below.

Referring again to step 604, if two tracks 110, 112 under consideration are not both in a major key, or are not both in a minor key ("No" in step 604), then, prior to determining the score Ksong(key), the relative key or pitch corresponding to the key or pitch, respectively, of one of those tracks 110, 112 is determined (step 606). For example, each pitch in the major key in Western music is known to have an associated relative minor, and each pitch in the minor key is known to have a relative major. Such relationships between relative majors and minors may be stored in a lookup table stored in a database (such as the database described above). FIG. 1 represents one example of the lookup table (LUT) 1133. To determine a relative major or minor of a key of a particular track 110, 112 in step 606, the key of the track 110, 112 can be correlated to in the lookup table 1133, and the relative major or minor key associated with the correlated-to key can be accessed/retrieved from the table 1133, wherein the relative key is in the same key type (e.g., major or minor) as the other track 110, 112 under consideration. By example and without limitation, where a candidate track 110 is determined to be in a key of A major in step 602, and the query track 112 is determined to be in a key of D minor in step 602, then it is determined in step 604 that those tracks 110, 112 have different key types ("No" in step 604). Control then passes to step 606 where, in one example embodiment herein, D minor is correlated to a key in the lookup table 1133, to access the relative major (e.g., F major) stored in association therewith in the lookup table 1133. The accessed key (e.g., F major) is then passed with the A major key to step 608 to calculate the score Ksong(key) based thereon, in a manner to be described below.

Step 608 will now be described. In step 608, a determination is made of the difference in semitones between the root notes of the keys received as a result of the performance of step 604 or 606, wherein the difference is represented by variable "n_semitones". In one example herein, the difference n_semitones can be in a range between a minimum of zero "0" and a maximum of six "6", although this example is not limiting.

By example, if a candidate track 110 under consideration is in a major key and has a root pitch class of A major, and the query track 112 under consideration also is in a major key and has a root pitch class of B major ("Yes" in step 604), then in step 608 a determination is made of the difference (in semitones) between those root pitch classes, which in the present example results in a determination of two ('2') semitones (i.e., n_semitones=2). In another example, in a case in which the candidate track 110 under consideration is in a major key and has a root pitch class of C major, and the query track 112 under consideration is in a minor key and has a root pitch class of G minor ("No" in step 604), then the relative minor of C major (e.g., A minor) is correlated to and accessed from the lookup table 1133 in step 606, and is provided to step 608 along with G minor. In step 608, a determination is made of the difference (in semitones) between those root pitch classes, which in the present example results in a determination of two ('2') semitones (i.e., n_semitones=2).

Step 610 will now be described. According to an example embodiment herein, step 610 is performed to determine the closeness in key score, using the following formula (F6):

$$Ksong(key)=\max(0,\min(1,1-\mathrm{abs}(n\_semitones*K\_semitone\_change)-mode\_change\_score\_penalty)) \quad (F6),$$

where the variable Ksong(key) represents the closeness in key score, variable n_semitones represents the difference determined in step 608, and mode_change_score_penalty is pre-set equal to '0' if both songs are in a same key type (in the case of "Yes" in step 604), or is equal to a value of a constant K_mode_change_score, which represents a penalty for requiring a change in key type (in the case of "No" in step 604). In one example embodiment herein, constant K_mode_change_score is equal to a predetermined value, such as, by example and without limitation, 0.9. Also in formula (F6), and according to one example embodiment herein, K_semitone_change is equal to a predetermined value, such as, by example and without limitation, 0.4. Which particular value is employed for the variable K_semitone_change depends on how much it is desired to penalize any transpositions that may be required to match both key types (i.e., in the case of "No" in step 604), and can depend on, for example, the quality of a pitch shifting algorithm used, the type (e.g., genre) of music used, the desired musical effect, etc.

Figure 7:
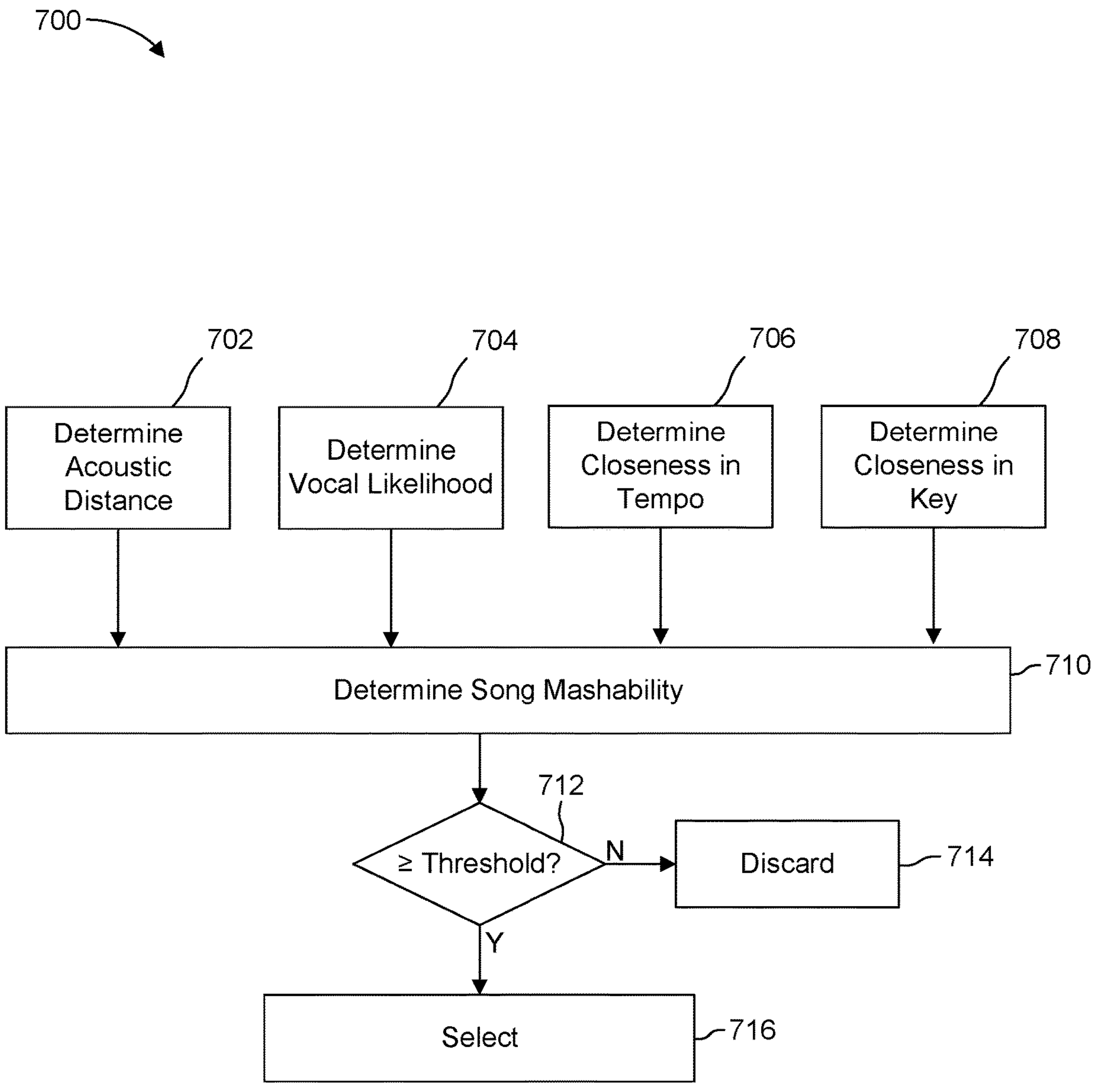
FIG. 7 is a flow diagram of a procedure for determining a song mashability score, according to an example aspect herein.

According to an example aspect herein, a song mashability score (represented by variable (Ksong[j])) between the query track 112, and each of the candidate tracks 110, can be determined. Reference is now made to FIG. 7 which shows a procedure 700 for determining a song mashability score, with respect to a given jth candidate track 110 under consideration. In step 702, an acoustic feature vector distance Ksong(acoustic)[j] is determined, wherein in one example embodiment herein, the acoustic feature vector distance is determined in the manner described above and shown in FIG. 4 with respect to the jth candidate track 110. In step 704, a determination is made of the likelihood that a segment under consideration includes vocals (in other words, a vocalness likelihood score Ksong(vocalness)[j] is determined), with respect to the jth candidate track 110. In one example embodiment herein, the determination is made in the manner described above and shown in FIG. 5. In step 706, a closeness in tempo score (Ksong(tempo)[j]) is determined for tracks under consideration (e.g., the query track 112 and the jth candidate track 110 under consideration). In one example embodiment herein, that score is determined as described above and represented by formula F6, with respect to the jth candidate track 110. In step 708, a determination is made of a closeness in key score Ksong(key)[j], to measure the closeness of the keys of those tracks 110, 112 under consideration. According to one example embodiment herein, step 708 is performed as described above and shown in FIG. 6, with respect to the jth candidate track 110 although this example is not limiting. In step 710, a song mashability score Ksong is determined as the product of the scores determined in steps 702 to 708. In particular, the song mashability score Ksong[j], for the query track 112 and given candidate track (j), is represented by formula (F7):

$$Ksong[j]=Ksong(key)[j]*Ksong(tempo)[j]*Ksong(vocalness)[j]*Ksong(acoustic)[j] \quad (F7).$$

In one example embodiment herein, the resulting vector Ksong [j] has Nc components, where Nc corresponds to the number of candidate tracks. Steps 702 to 710 of procedure 700 can be performed with respect to each of the j candidate tracks 110 to yield respective scores Ksong [j] for each such track 110. Also in one example embodiment herein, song mashability score Ksong [j] determined for the j candidate tracks 110 can be ordered in descending order (in step 710) from greatest score to least score (although in another example, they may be ordered in ascending order, from least score to greatest score).

In one example embodiment herein, to limit the number of tracks that may be employed for mashing up, certain ones of the j candidate tracks 110 can be eliminated based on predetermined criteria. As an example, respective mashability scores Ksong [j] determined for respective ones of the j candidate tracks 110 can be compared individually to a predetermined threshold value (step 712). If a score is less than the predetermined threshold value ("No" in step 712), then the respective candidate track 110 is discarded (step 714). If a score is equal to or greater than the predetermined threshold value ("Yes" in step 712), then the respective candidate track 110 under consideration is maintained (selected) in step 716 (for eventually being mashed up in step 308 of FIG. 3). In one example embodiment herein, step 716 additionally can include selecting only a predetermined number of the candidate tracks 110 for which the predetermined threshold was equaled or exceeded in step 712. By example only, step 716 can include selecting the candidate tracks 110 having the twenty greatest Ksong [j] scores, for being maintained, and the other tracks 110 can be discarded.

Segment Suggestion Procedure

Figure 18:
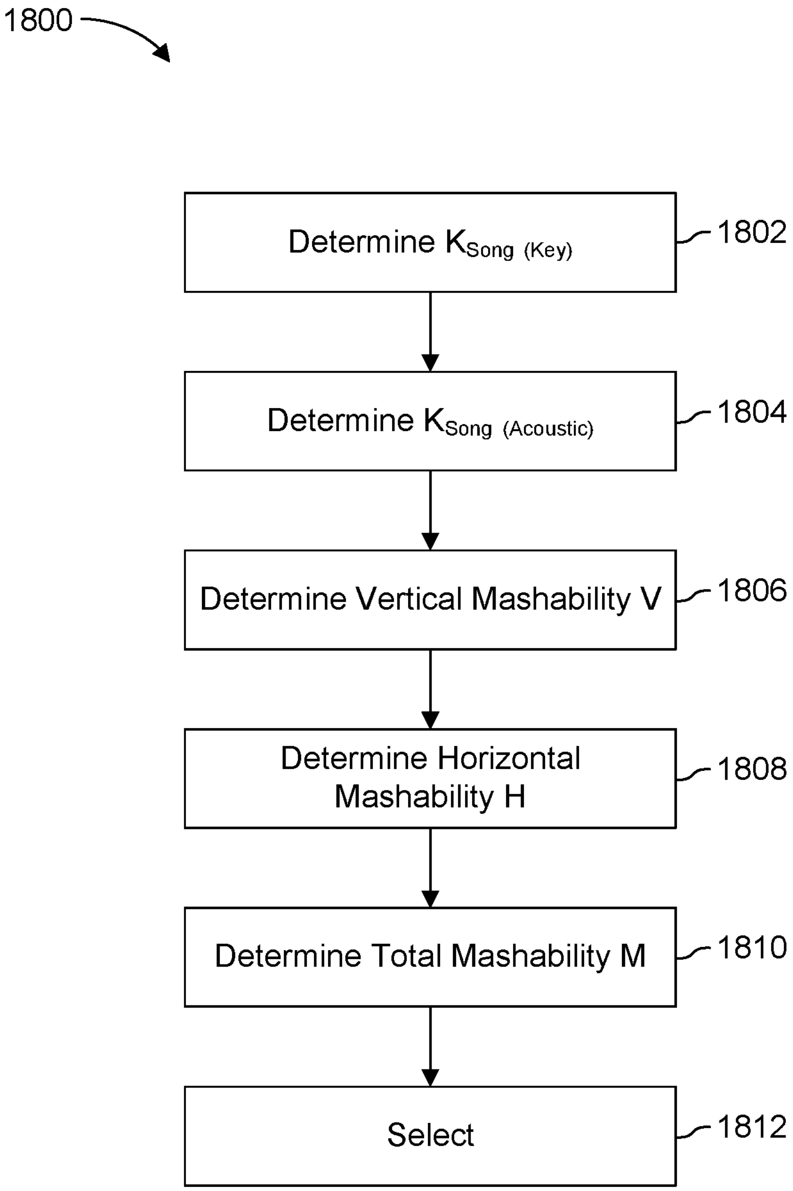
FIG. 18 is a flow diagram of a segment suggestion procedure, according to an example embodiment herein.

Having described the manner in which song mashability is determined according to an example embodiment herein, a procedure for finding a segment, such as, e.g., a candidate (e.g., vocal) segment 124, with high mashability relative to a query track (e.g., an accompaniment track) 112 according to another example aspect herein, will now be described, with reference to FIG. 18. The procedure, which also is referred to herein as a "segment suggestion procedure 1800" and which will be described below in the context of FIG. 18, is performed such that, for each of the query segments 122 (of the query track 112) assigned to S_subs and S_add (in steps 224 and 226, respectively), compatible vocals from candidate tracks 110 under consideration are searched for and identified, wherein in one example embodiment herein, the candidate tracks 110 are those maintained (selected) in step 716 of FIG. 7 described above. As will be described in detail below, the procedure 1800 involves determining a segment-wise compatibility score. That is, for each of the segments (S_subs and S_add) 122 in the query track 112, respective compatibility scores between the query track segment 122 and respective segments 124 from corresponding ones of the maintained candidate tracks 110 is determined. In one example, the compatibility score ("segment mashability score") is based on "vertical mashability (V)" and a "horizontal mashability (H)". Before describing the segment suggestion procedure 1800 of FIG. 18 in detail, vertical mashability and horizontal mashability will first be described.

FIGS. **9*a* and 9*b* show a procedure 900 for determining vertical mashability, according to an example aspect herein. In some examples, steps 902-918 of the procedure 900, described herein, can be performed in an order other than the one shown in FIGS. 9*a* and 9*b*. In other examples, more or less number of steps may be performed than the ones show in FIGS. 9*a* and 9*b***.

In one example embodiment herein, to enable a vertical mashability score to be calculated, a minimum length of segments (in terms of the number of beats thereof) is first determined in step 902, using the following formula (F8):

$$Nbeats=\min(Nvoc,Nacc) \quad (F8),$$

where variable Nbeats represents a minimum length of segments (in terms of number of beats), Nvoc represents the number of beats of the candidate (e.g., vocal) segment 124 under consideration, and variable Nacc represents the number of beats of the query segment 122 under consideration from the query track 112. In the initial performance of step 902, the segments under consideration include a first query segment 122 of the query track 112 and a first candidate segment 124 of the candidate track 110 under consideration.

Figure 10:
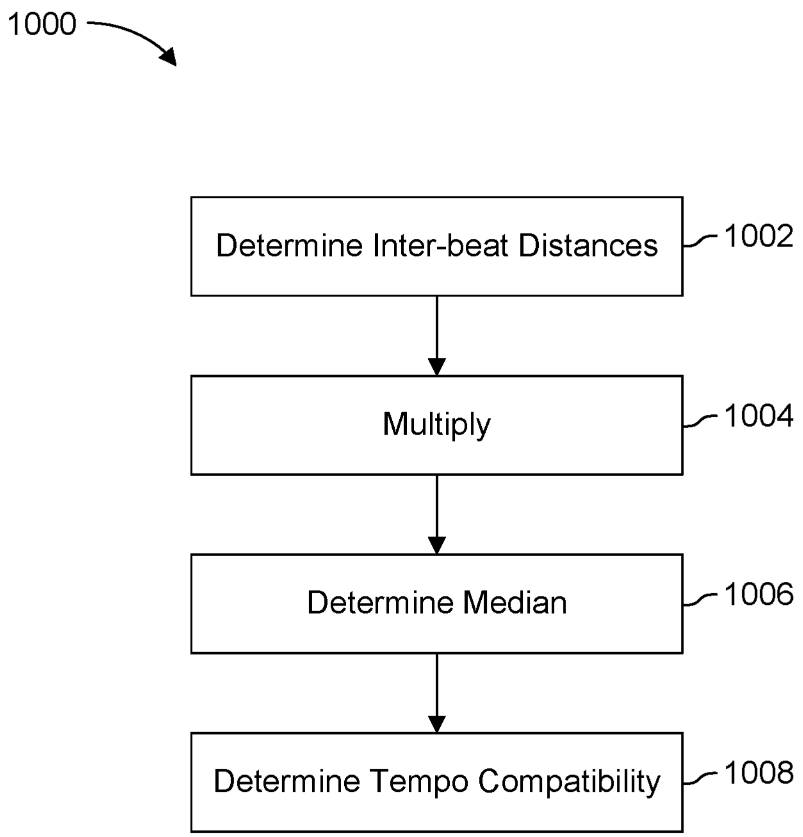
FIG. 10 shows a flow diagram of a procedure for determining a tempo compatibility between candidate and query segments of tracks, as part of the procedure of FIGS. 9*a* and 9*b*, according to an example embodiment herein.

In a next step 904, a tempo compatibility between the candidate segment 124 and the query segment 122 is determined (in one example, the closer the tempo, the higher is a tempo compatibility score K_seg_tempo, to be described below). In one example embodiment herein, step 904 can be performed according to procedure 1000 shown in FIG. 10. In step 1002, inter-beat distances (in seconds) in each respective segment 122, 124 are determined. Inter-beat distances can be derived as the difference between consecutive beat positions. In step 1004, the respective determined inter-beat distances are multiplied by a predetermined value (e.g., 1/60, such as to convert from inter-beat distances in seconds to tempi in beats-per-minute), to produce resulting vectors of values representing time-varying tempi of the respective segment 122, 124 (i.e., a time-varying tempo of segment 122, and a time-varying tempo 122 of segment 124). Then, in step 1006 the median value of the vector (from step 1004) is determined for each respective segment 122, 124, to obtain a single tempo value for the respective segment 124. Then, a tempo compatibility score K_seg_tempo is determined in step 1008 according to the following formula (F9):

$$K\_seg\_tempo=\max([min\_score,1-\mathrm{abs}(\log 2(tempo\_candidate/tempo\_query)*K)]) \quad (F9),$$

where K_seg_tempo represents the tempo compatibility score, min_score represents a predetermined minimum value for that score (e.g., 0.0001), tempo_candidate represents the tempo value obtained for the candidate segment 124 in step 1006, tempo_query represents the tempo value obtained for the query segment 122 in step 1006, and K is a value to control a penalty due to tempo differences. K is a predetermined constant, (e.g. 0.2). The higher the value of K, the lower the score. In other words, it is more important that the query and candidate have similar tempi. It is noted that, the closer the tempi of the segments 122, 124 are, the greater is the score.

Figure 11:
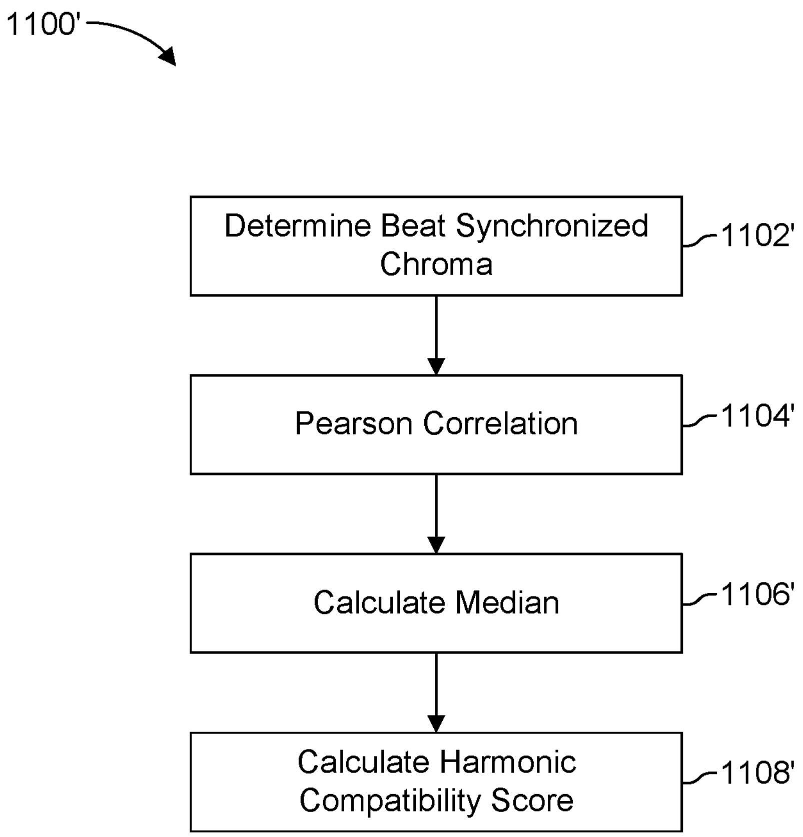
FIG. 11 is a flow diagram of a procedure for performing a harmonic progression compatibility determination, as part of the procedure of FIGS. 9*a* and 9*b*, according to an example embodiment herein.

Referring again to FIG. 9*a*, after tempo compatibility (e.g., score K_seg_tempo) is determined in step 904, harmonic progression compatibility (also referred to herein as "harmonic compatibility") is determined in step 906. In one example embodiment herein, the closer the harmonic compatibility of segments 110, 112 under consideration, the higher is the score. Also, in one example embodiment herein, step 906 can be performed according to procedure 1100' shown in FIG. 11. In step 1102' beat synchronized chroma feature vectors are determined for each of the query segment 112 and candidate segment 110 under consideration, by determining, for each respective segment 110, 112, an average of chroma values within each beat of the respective segment 110, 112. In one example embodiment herein, the chroma values are obtained from among the information 1131 in the database using methods described in the Jehan reference discussed above. In step 1104' a Pearson correlation between the beat synchronized chroma feature vectors determined in step 1102', is determined for each of the beats of the segments under consideration. For example, the segments may include a segment of the query track (chroma values taken only from the accompaniment), and one segment of the candidate track underanalysis (only computing chroma values of the vocal part). In step 1106' a median value (med_corr) of vectors of beat-wise correlations determined in step 1104' is calculated. Then, in step 1108' a harmonic (progression) compatibility score (K_seg_harm_prog) is determined using formula (F10) below, according to an example embodiment herein:

$$K\_seg\_harm\_prog=(1+med\_corr)/2 \quad (F10),$$

wherein K_seg_harm_prog represents the harmonic compatibility score, and med_corr represents the median value determined in step 1106'.

Figure 12:
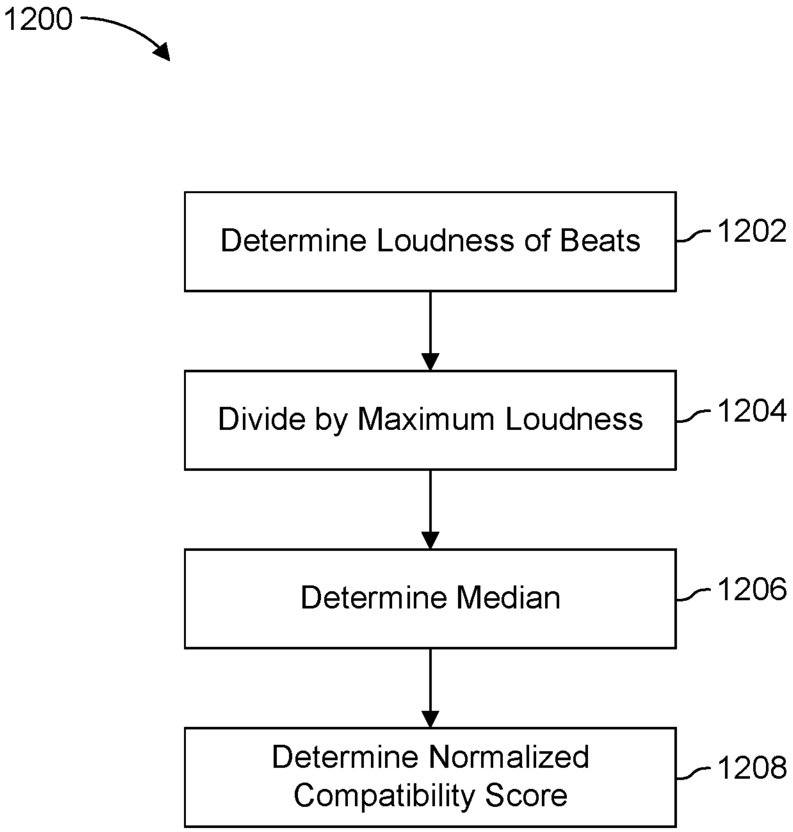
FIG. 12 shows a flow diagram of a procedure for determining a loudness compatibility score, as part of the procedure of FIGS. 9*a* and 9*b*, according to an example embodiment herein.

Another factor involved in vertical mashability is normalized loudness compatibility. Referring again to FIG. 9*a*, before, or after or in parallel with when harmonic progression compatibility is determined in step 906, normalized loudness compatibility is determined in step 908. In one example embodiment herein, the closer the normalized loudness of query and candidate segments 122, 124, the higher is a loudness compatibility score. In one example embodiment herein, the loudness compatibility score is determined in step 908 according to procedure 1200 of FIG. 12. In steps 1202 to 1206, a determination is made of the relative loudness of the query and target segments 122, 124 within the complete tracks. More particularly, for each of the query segment 122 and the candidate segment 124 under consideration, a loudness of each of the beats of the respective segment is determined (step 1202), wherein the loudness, in one example embodiment, may be obtained from among the information 1131 stored in the database. The determined loudness of each segment 122, 124 is divided by a maximum loudness of any beat in the corresponding track (i.e., the query track 112 or candidate track 110, respectively), to obtain a vector of size Nbeats for the segment, where Nbeats corresponds to the number of beats in the segment (step 1204). Then, for each vector determined in step 1204, a median value of the vector is determined in step 1206 (as a "median normalized loudness"). The median value determined for the query segment 122 in step 1206 is referred to as "query_loudness", and the median value determined for the candidate segment 124 in step 1206 is referred to as a "target_loudness". In step 1208 a normalized loudness compatibility score, represented by K_seg_norm_loudness, is determined according to the following formula (F11):

$$K\_seg\_norm\_loudness=\min([target\_loudness,query\_loudness])/\max([target\_loudness,query\_loudness]) \quad (F11),$$

where K_seg_norm_loudness represents the normalized loudness compatibility score, target_loudness represents a loudness of the candidate (target) segment 124 (as determined in step 1206), and query_loudness represents a loudness of the query segment 122 (as also determined in step 1206).

Another factor involved in vertical mashability is vocal activity detection on the segment of the candidate (e.g., vocal) track 110 under consideration. Referring again to FIG. 9*a*, after the normalized loudness compatibility score is determined in step 908, vocal activity detection is performed in step 910 for the candidate track 110. In one example embodiment herein, a higher vocal activity in a segment results in a higher vocal activity score. In the present example embodiment, K_seg_vad represents a mean normalized loudness of beats of the candidate track 110. The relationship between K_seg_vad and vertical mashability is described in further detail in formula F17 below. In another example embodiment herein, a voice activity detector can be employed to address possible errors in vocal source separation.

Figure 13:
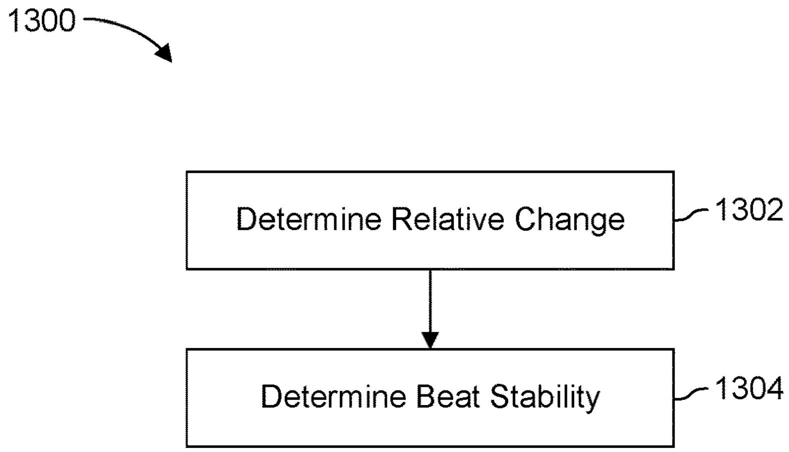
FIG. 13 shows a flow diagram of a procedure for performing a beat stability determination, as part of the procedure of FIGS. 9*a* and 9*b*, according to an example embodiment herein.

Beat-stability can be another factor involved in vertical mashability. Beat-stability, for a candidate segment 124, is the stability of beat duration in a candidate segment 124 under consideration, wherein, in one example embodiment herein, a greater beat stability results in a higher score. Beat stability is determined in step 912 of FIG. 9. Step 912 is preferably performed according to procedure 1300 of FIG. 13. In step 1302, a relative change between durations of consecutive beats in the candidate segment 124 is determined, according to the following formula (F12):

$$\text{delta\_rel}[i] = \max\left(\frac{|dur_i - dur_{i-1}|}{dur_{i-1}}, \frac{dur_i - dur_{i-1}}{dur_i}\right) \quad (F12)$$

where i corresponds to the index of a beat, and delta_rel[i] is a vector representing a relative change between durations of consecutive beats in the candidate segment 124 under consideration. In one example embodiment herein, "dur" represents a duration, the vector (delta_rel[i]) has a size represented by (Nbeats−1), and formula (F12) provides a maximum value.

In step 1304, a beat stability score, K_seg_beat_stab, is determined according to the following formula (F13):

$$K\_seg\_beat\_stab=\max(0,1-\max(delta\_rel)) \quad (F13).$$

Another factor involved in vertical mashability is harmonic change balance, which measures if there is a balance in a rate of change in time of harmonic content (chroma vectors) of both query and candidate (target) segments 122, 124. Briefly, if musical notes change often in one of the tracks (either query or candidate), the score is higher when the other track is more stable, and vice versa.

Figure 9A:
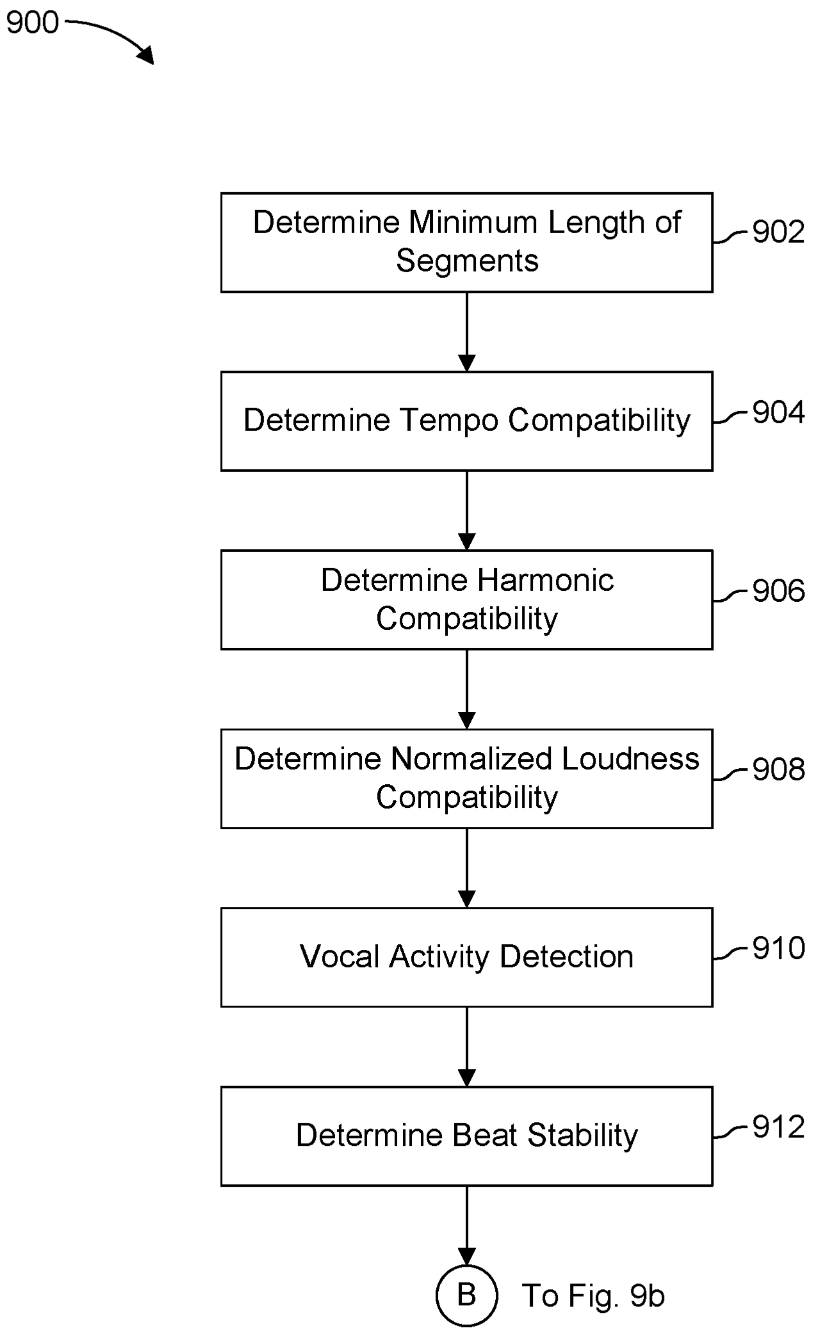
FIG. 9 (including FIGS. 9*a* and 9*b*) shows a flow diagram of a procedure for determining vertical mashability, according to an example aspect herein.
Figure 9B:
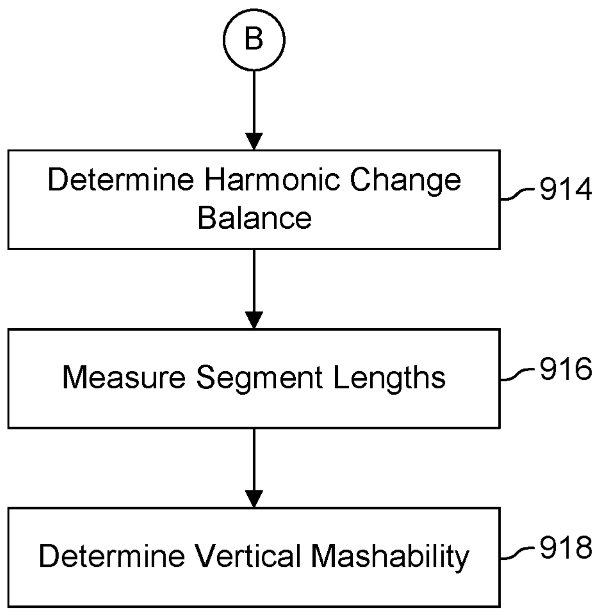
Figure 14:
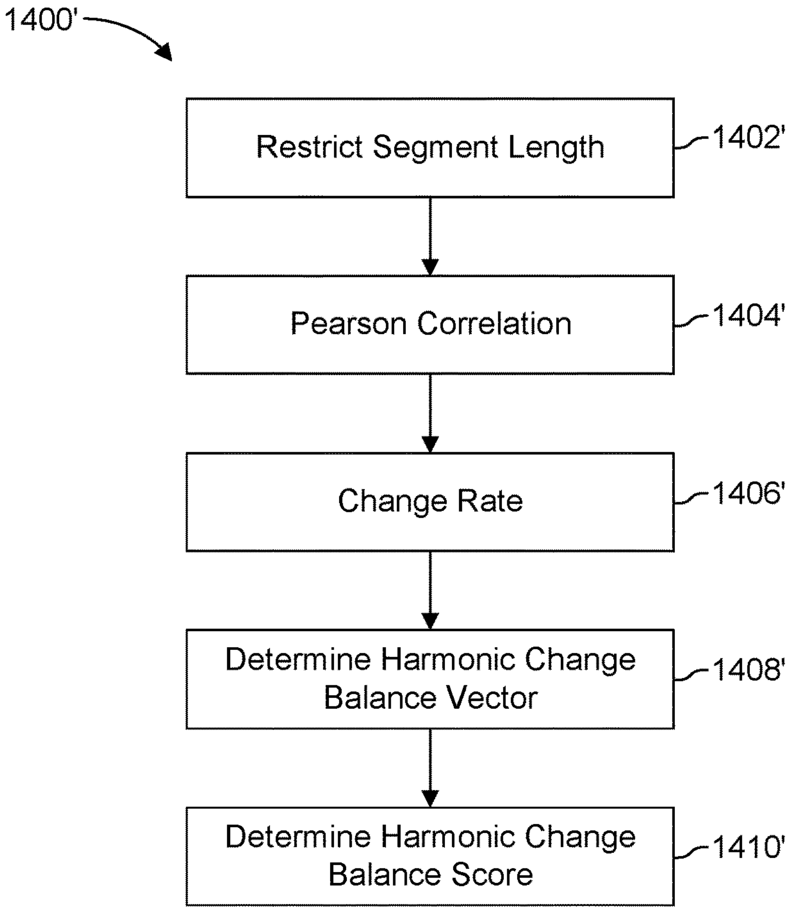
FIG. 14 shows a flow diagram of a procedure for performing a harmonic change balance determination, as part of the procedure of FIGS. 9*a* and 9*b*, according to an example embodiment herein.

Harmonic change balance is determined in step 914 of FIG. 9*b*, which is connected to FIG. 9*a* via connector B. Details of how harmonic change balance is determined, according to one example embodiment herein, are shown in procedure 1400' of FIG. 14. In step 1402' a length of the segments 122, 124 under consideration is restricted to that of one of the segments 122, 124 with a minimal amount of beats (Nbeats) (i.e., either the query segment 122 or the candidate segment 124). Next, a harmonic change rate between consecutive beats is determined, for each of the query track 112 and candidate track 110 under consideration, as follows. A Pearson correlation between consecutive beat-synchronised chroma vectors is determined, for all beats of each track 110, 112 (step 1404'), to provide a vector (Nbeats−1) of correlation values. In step 1406', the correlation is mapped to change rate values according to formula (F13):

$$\text{Change}=(1-\text{corr})/2 \quad \text{(F14).}$$

As a result, a vector is obtained with (Nbeats−1) change rate values for both candidate and query tracks, 110, 112, wherein the change rate value for the candidate (e.g., vocal) track 110 is represented by "CRvoc", and the change rate value for the query (accompaniment) track 112 is represented by "CRacc".

A Harmonic Change Balance (HCB) vector is then determined in step 1408' according to the following formula (F15):

$$\text{HCB}[i]=1-\text{abs}(\text{CRacc}[i]-(1-\text{CRvoc}[i])) \quad \text{(F15),}$$

where HCB[i] represents a Harmonic Change balance, value [i] corresponds to each element of the change rate vectors, CRvoc is the change rate value for the candidate (e.g., vocal) track 110, and CRacc is the change rate value for the query track 112.

A Harmonic change balance score (K_harm_change_bal) is then determined in step 1410' according to the following formula (F16):

$$K\_\text{harm\_change\_bal}=\text{median}(\text{HCB}) \quad \text{(F16).}$$

Another factor involved in vertical mashability is segment length. In one example embodiment herein, the closer the lengths of the query and candidate segments 112, 110 (measured in beats) are to each other, then the greater is a segment length score K_len. Segment length is measured in step 916 of FIG. **9*b*** by a segment length score (K_len), which is determined according to the following formula (F17):

$$K\_\text{len}=\min([N\text{voc}/N\text{acc},N\text{acc}/N\text{voc}]) \quad \text{(F17),}$$

wherein K_len represents the segment length score, Nvoc represents a length of a candidate segment 124 under consideration, and Nacc represents a length of a query segment 122 under consideration.

According to an example embodiment herein, vertical mashability is measured by a vertical mashability score (V), which is determined as the product of all the foregoing types of scores involved with determining vertical mashability. According to one example embodiment herein, the vertical mashability score (V) is determined according to the following formula (F18), in step 918:

$$V=(K\_\text{seg\_harm\_prog}\hat{}(W\_\text{seg\_harm\_prog}))*(K\_\text{seg\_tempo}\hat{}(W\_\text{seg\_tempo}))*(K\_\text{seg\_vad}\hat{}(W\_\text{seg\_vad}))*(K\_\text{seg\_beat\_stab}\hat{}(W\_\text{seg\_beat\_stab}))*(K\_\text{harm\_change\_bal}\hat{}(W\_\text{harm\_change\_bal}))*(K\_\text{len}\hat{}(W\_\text{len})) \quad \text{(F18),}$$

where the symbol ^ represents a power operator, the term W_seg_harm_prog represents a weight for the score K_seg_harm_prog, the term W_seg_tempo represents a weight for the score K_seg_tempo, the term W_seg_vad represents a weight for the term K_seg_vad, the term W_seg_beat_stab represents a weight for the term K_seg_beat_stab, the term W_harm_change_bal represents a weight for the term K_harm_change_bal, and the term W_len represents a weight for the term K_len.

The weights enable control of the impact or importance of each of the mentioned scores in the calculation of the overall vertical mashability score (V). In one example embodiment herein, one or more of the weights have a predetermined value, such as, e.g., '1'. Weights of lower value result in the applicable related score having a lesser impact or importance on the overall vertical mashability score, relative to weights having higher scores, and vice versa.

Horizontal mashability will now be described in detail. A horizontal mashability score (H) considers a closeness between consecutive tracks. In one example embodiment, to determine horizontal mashability, tracks from which vocals may be employed (i.e., candidate tracks 110) for a mashup are considered.

To determine horizontal mashability, a distance is computed between the acoustic feature vectors of the candidate track 110 whose segment 124 is a current candidate and a segment 124 (if any) that was previously selected as a best candidate for a mashup. The smaller the distance, the higher is the horizontal mashability score. Determining horizontal mashability also involves considering a repetition of the selected segment 124. FIG. **8*c*** represents acoustic feature vector determination and repetitions, used to determine horizontal mashability.

Figure 15:
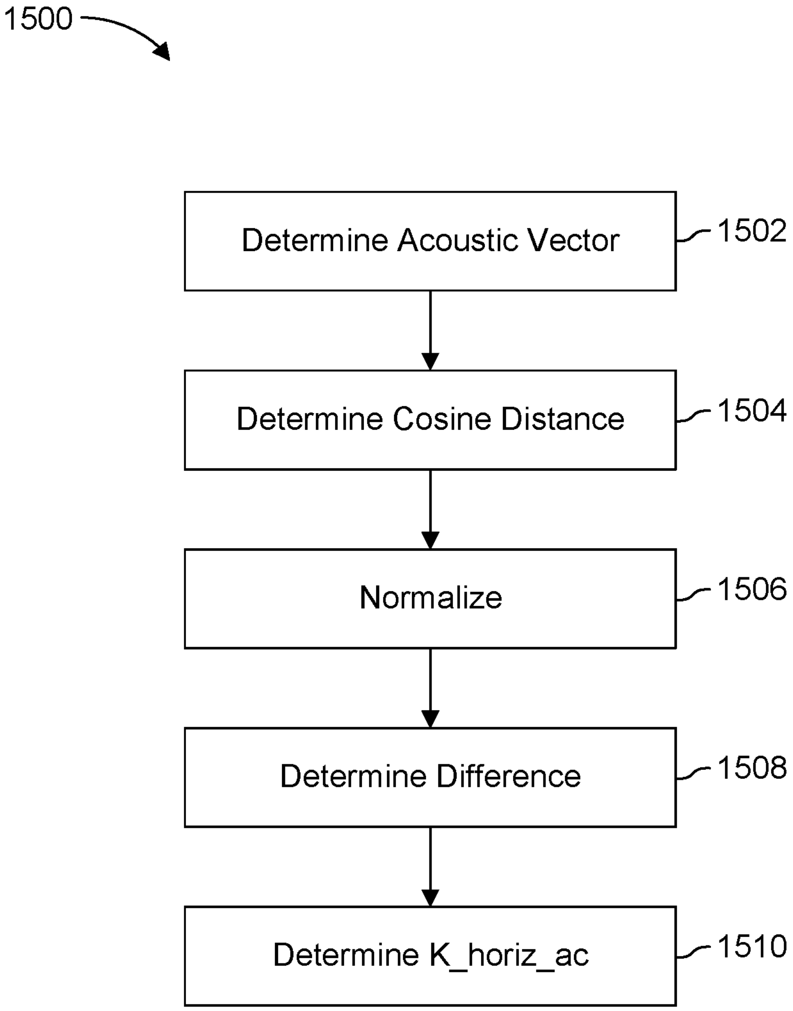
FIG. 15 shows a flow diagram of a procedure for determining an acoustic feature vector distance, according to an example embodiment herein.

In one example embodiment herein, an acoustic feature vector distance is determined according to procedure 1500 of FIG. 15. In step 1502, the acoustic feature vector of the candidate track 110 from which a current segment i under consideration (a selected segment) is determined, without separation (selected-mix_ac). The acoustic feature vector of the candidate track is computed from the acoustic vector of the selected song for vocal segment i. In step 1504, a cosine distance between selected-mix_ac and all acoustic feature vectors of candidate tracks 110 for segment i+1 is determined. In one example embodiment herein, step 1504 determines a respective vector of acoustic feature vector distances between the query track 112 and each candidate track 110, using a predetermined algorithm.

A next step 1506 includes normalizing the distance vector (from step 1504) by its maximum value, to obtain a normalized distance vector (step 1506). A final vector of acoustic feature vector distances (Vsegdist) is within the interval [0,1].

For a given candidate track 110 with index j, formula (F19) is performed in step 1508 to determine a distance ("difference") between the final vector of acoustic feature vector distances (Vsegdist) and an ideal normalized distance:

$$\text{difference}=V\text{segdist}[j]-\text{ideal\_norm\_distance} \quad \text{(F19),}$$

where Vsegdist[j] is the final vector of acoustic feature vector distances (determined in step 1506), and "ideal_norm_distance" is the ideal normalized distance. In one example embodiment herein, the ideal normalized distance ideal_norm_distance can be predetermined, and, in one example, is zero ('0'), to provide a higher score for acoustically similar tracks (to allow smooth transitions between vocals in terms of style/genre).

A value of K_horiz_ac is then determined in step 1510 according to the following formula (F20):

$$K\_\text{horiz\_ac}=\max(0.01,1-\text{abs}(\text{difference})) \quad \text{(F20),}$$

where K-horiz_ac represents a horizontal acoustic distance score of the candidate track 110 with index j.

Figure 16:
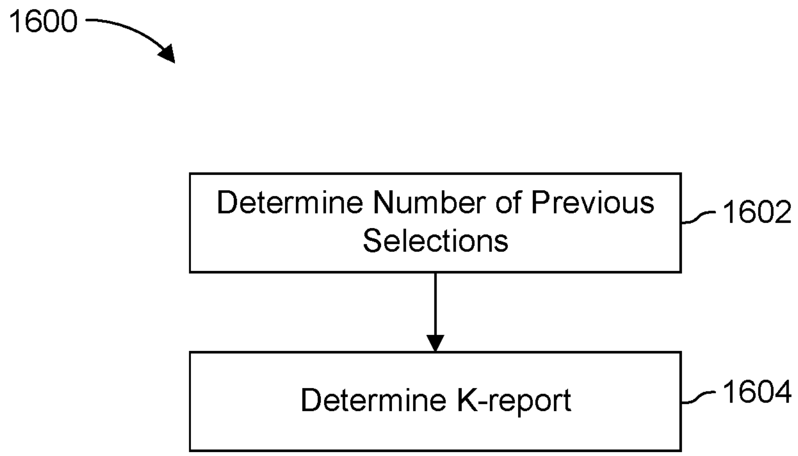
FIG. 16 is a flow diagram of a procedure for determining repetitions of a given segment of a music track, according to an example embodiment herein.

The manner in which the number of repetitions of a given segment 124 is determined (e.g., to favor changing between vocals of different tracks/segments), will now be described with reference to the procedure 1600 of FIG. 16. For a given candidate segment 124 under consideration, in step 1602 a determination is made of the number of times the specific segment 124 of a candidate track 110 has already been previously selected as the best candidate in searches of candidate segments 110 (e.g., vocal segments) for being mixed with previously considered query segments 122, wherein the number is represented by "num_repet". Then, in step 1604 a value for a number of repetitions (K_repet) of the candidate segment 110 under consideration is determined according to the following formula (F21):

$$K\_repet=1/(1+num\_repet) \quad (F21),$$

where, as described above, num_repet is equal to the number of times the specific segment 124 has already been previously selected as the best candidate in searches of candidate segments 110 (e.g., vocal segments) for being mixed with previously considered query segments 122.

Figure 17:
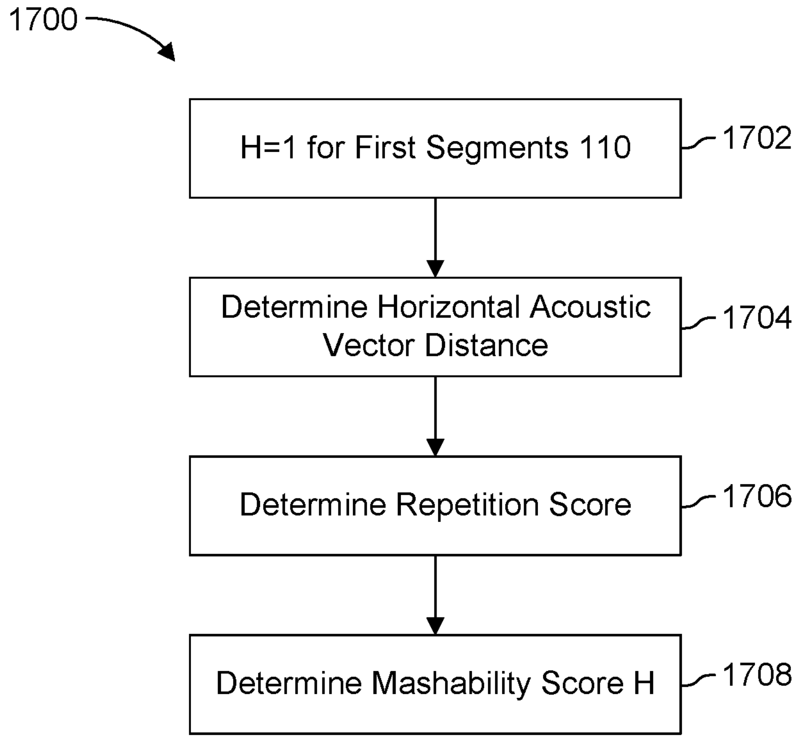
FIG. 17 is a flow diagram of a procedure for determining a horizontal mashability score according to an example aspect herein.

A procedure 1700 for determining a horizontal mashability score according to an example aspect herein will now be described, with reference to FIG. 17. Since a search for compatible vocals is performed sequentially (i.e., segment-wise) in one example embodiment herein, a first segment 124 under consideration is assigned a horizontal mashability score H equal to '1' (step 1702). For each of additional following segment searches, a horizontal mashability score is determined between the given candidate segment 124 (under consideration) of a candidate track 110, and a previously selected candidate segment 124 (a segment 124 previously determined as a best candidate for being mixed with previous query segments 112), as will now be described. For example, in step 1704, for the given segment 124 under consideration, a determination is made of a horizontal acoustic feature vector distance score K_horiz_ac for the segment 124. In one example embodiment herein, step 1704 is performed according to procedure 1500 of FIG. 15 described above. In a next step 1706, a determination is made of a repetition score K_repet for the segment. In one example embodiment herein, step 1706 is performed according to procedure 1600 of FIG. 16 described above. Then, in step 1708, a horizontal mashability score H is determined according to the following formula (F22):

$$H=(K\_horiz\_ac\hat{\ }W\_horiz\_ac)*(K\_repet\hat{\ }W\_repet) \quad (F22),$$

where H represents the horizontal mashability score, and W_horiz_ac and W_repet are weights that allow control of an importance or impact of respective scores K_horiz_ac and K_repet in the determination of value H. In one example embodiment herein, W_horiz_ac=W_repet=1 by default.

Referring now to FIG. 18, a procedure 1800 for determining a mashability score (M) for each candidate segment 124 will now be described. In step 1802 a key distance score (Ksong(key)) is determined, wherein in one example embodiment herein, step 1802 is performed according to procedure 600 of FIG. 6. In step 1804 a normalized distance in tracks' acoustic feature vector (Ksong(acoustic)) is determined, wherein in one example embodiment herein, step 1804 is performed according to procedure 400 of FIG. 4. In step 1806, a vertical mashability score V for the segment 124 is determined, wherein in one example embodiment herein, step 1806 is performed according to procedure 900 of FIGS. 9*a* and 9*b*. In step 1808, a horizontal mashability score H for the segment 124 is determined, wherein in one example embodiment herein, step 1808 is performed according to procedure 1700 of FIG. 17. In step 1810, a total mashability score M[j] is determined according to the following formula (F23):

$$M[j]=Ksong(key)[j]*Ksong(acoustic)[j]*V[j]*H[j] \quad (F23)$$

where M[j] represents the total mashability score for a jth segment 124 under consideration, Ksong(key)[j] represents the key distance score for the segment 124, Ksong(acoustic)[j] represents the acoustic feature vector calculated for the segment 124, V[j] represents the vertical mashability score for the segment 124, and H[j] represents the horizontal mashability score H for the segment 124. Steps 1802 to 1810 can be performed for each segment 124 of candidate track(s) 110 under consideration.

After computing the score (M) for all segments 124 of all candidate tracks 110 under consideration, the segment 124 with the highest total mashability score (M) is selected (step 1812), although in other example embodiments, a sampling between all possible candidate segments can be done with a probability which is proportional to their total mashability score. The above procedure can be performed with respect to all segments 122 that were assigned to S-subs and S_add of the query track 112 under consideration, starting from the start of the track 112 and finishing at the end of the track 112, to determine mashability between those segments 122 and individual ones of the candidate segments 124 of candidate tracks 110 that were selected as being compatible with the query track 112.

Boundary and Transition Position Refinement

As described above with respect to the procedure 300 of FIG. 3, in step 304, beat and downbeat alignment is performed for a segment 122 under consideration (a segment 122 assigned to S_subs or S_add) and a candidate (e.g., vocal) segment(s) 124 determined to be compatible with the segment 122 in step 302. Also, in step 306, transition refinement is performed for the segment 122 under consideration and/or the candidate segment(s) 124 aligned in step 304, wherein each step 302 and 304 may be performed based on, for example, segmentation information, beat and downbeat information, and/or voicing information, such as that stored among information 1131 in association with the corresponding tracks 110, 112 and/or segments 122, 124 in the database. Then, in step 308, those segments 112, 124 are mixed. The manner in which those steps 304, 306, and 308 are performed according to one example embodiment herein, will now be described in greater detail.

Alignment in step 304 of procedure 300 involves properly aligning the candidate (e.g., vocal) segment 124 with the segment 122 under consideration from the query track 112 to ensure that, once mixing occurs, the mixed segments sound good together. As an example, if a beat of the candidate segment 124 is not aligned properly with a corresponding beat of the segment 122, then a mashup of those segments would not sound good together and would not be in an acceptable musical time. Proper alignment according to an example aspect herein avoids or substantially minimizes that possibility.

Also by example, another factor taken into consideration is musical phrasing. If the candidate segment 124 starts or ends in the middle of a musical phrase, then a mashup would sound incomplete. Take for example a song like "I Will Always Love You," by Celine Dion. If a mashup were to select a candidate (e.g., vocal) segment that starts in the middle of the vocal phrase "I will always love you," (e.g., at ". . . ays love you" and cut off "I will alw . . . "), then the result would sound incomplete. Thus, in one example embodiment herein it is desired to analyze vocal content of the candidate segment 124 to determine whether the vocal content is present at the starting or ending boundary of the segment 124, and, if so, to attempt to shift the starting and/or ending boundaries to the start or end of the musical phrase so as to not cut the musical phrase off in the middle of the musical phrase.

Figure 21:
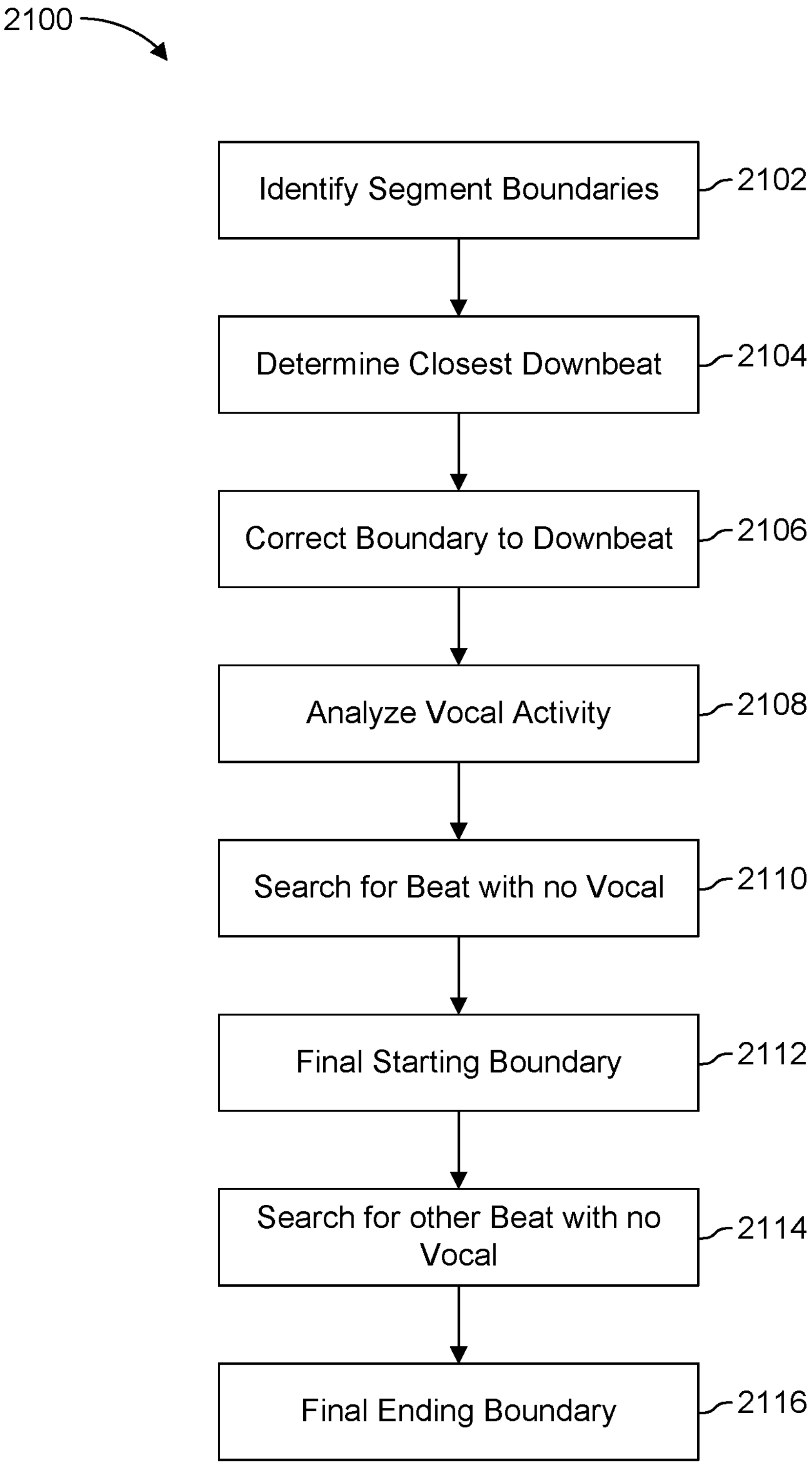
FIG. 21 shows a flow diagram of a procedure for performing transition refinement, as part of the procedure of FIG. 3, according to an example embodiment herein.
Figure 23:
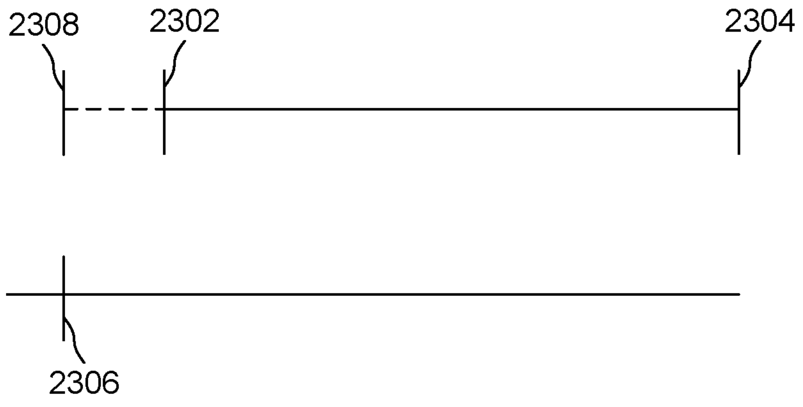
FIG. 23 represents starting and ending boundaries of a track segment, and variation thereof to a corrected position matching a downbeat location.

In one example embodiment herein, segment refinement in step 306 is performed according to procedure 2100 of FIG. 21. First, preliminary segment boundaries (including a starting and ending boundary) are identified for a segment 124 of a candidate track 110 (step 2102). The start and ending boundaries are then analyzed to determine a closest downbeat temporal location thereto (step 2104). In one example embodiment herein, steps 2102 and 2104 are performed based on segmentation information, beat and downbeat information, and/or voicing information (such as that stored among information 1131) for the query track 112 under consideration. Next, in step 2106, a preliminary segment boundary (e.g., one of the starting and ending boundaries) that varies from the downbeat temporal location is corrected temporally to match the downbeat location temporally (step 2106). FIG. 23 represents start and ending boundaries 2302, 2304 identified in step 2102, a closest downbeat location 2306 identified in step 2104, and variation of boundary 2302 to a corrected position 2308 matching the downbeat location 2306 in step 1206.

Vocal activity in the candidate track 110 is then analyzed over a predetermined number of downbeats around the downbeat location (e.g., 4 beats, either before or after the location in time) (step 1208), based on the beat and downbeat information, and voicing information. For a preliminary starting boundary of the candidate (e.g., vocal) segment 124, a search is performed (step 2110) for the first beat in the candidate track before that segment boundary in which the likelihood of containing vocals is lower than a predetermined threshold (e.g., 0.5, on a scale from 0 to 1, where 0 represents full confidence that there are not vocals at that downbeat and 1 represents full confidence that there are vocals at that downbeat). The first downbeat before the starting boundary that meets that criteria is selected as the final starting boundary for the candidate segment 124 (step 2112). This is helpful to avoid cutting a melodic phrase at the start of the candidate segment 124, and alignment between candidate and query segments 122, 124 is maintained based on the refined downbeat location. Similarly, for the ending boundary of the candidate segment 124, a search is performed (step 2114) for the first beat in the candidate track after the segment boundary in which the likelihood of containing vocals is lower than the threshold (e.g., 0.5), and that downbeat is selected as the final ending boundary of the candidate segment 124 (step 2116). This also is helpful to avoid cutting a melodic phrase at the end of the segment 124.

As such, by virtue of procedure 2100, the boundaries of the candidate segment 124 are adjusted so that the starting and ending boundaries of a segment are aligned with a corresponding downbeat, and the starting and ending boundaries can be positioned before or after a musical phrase of vocal content (e.g., at a point in which there are not vocals). The procedure 2100 can be performed for more than one candidate track 110 with respect to the query track 112 under consideration, including for all segments selected (even segments from different songs) as being compatible.

It is helpful to align the starting and ending boundaries with the downbeats. For example, if the corresponding insertion point of the instrumentals is also selected at a downbeat (of the instrumentals), then, when the two are put together by aligning the starting boundary of the vocals with the insertion point of the instrumentals, the beats will automatically also be aligned.

As described above, in procedure 300 of FIG. 3, segments 122, 124 are mixed. According to an example embodiment herein, mixing is performed based on various types of parameters, such as, by example and without limitation, (1) a time-stretching ratio: determined for each beat as a ratio between lengths of each of the beats in both tracks 110, 112; (2) a pitchshifting ratio: an optimal ratio, relating to an optimal transposition to match keys of the tracks; (3) a gain (in dB) to be applied to vocal content; and (4) transitions.

Figure 22:
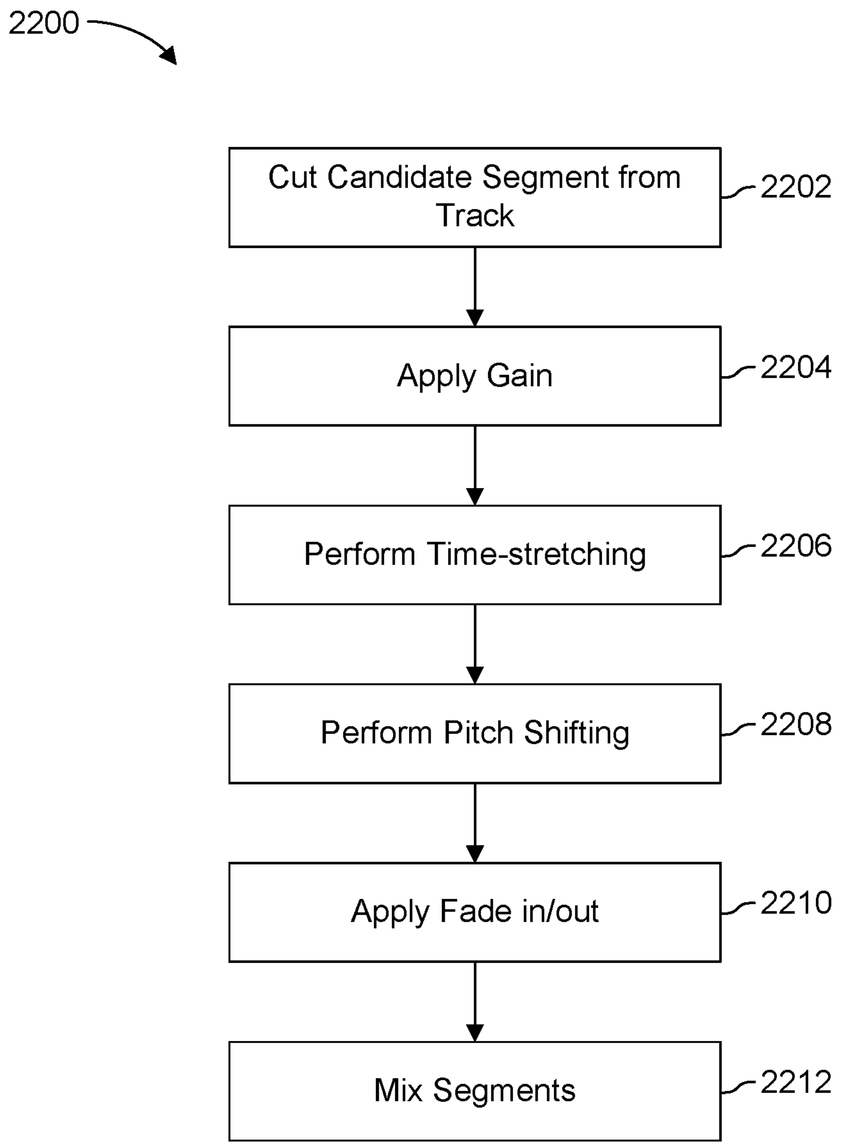
FIG. 22 shows a flow diagram of a procedure for mixing segments of candidate and query tracks, as part of the procedure of FIG. 3, according to an example embodiment herein.

FIG. 22 shows a procedure 2200 for mixing segments 122, 124, and can be performed as part of step 308 described above. The procedure 2200 includes cutting the candidate (e.g., vocal) segments 124 from each of the candidate tracks 110, based on the refined/aligned boundaries determined in procedure 2100 (step 2202). A next step includes applying one or more gains to corresponding candidate (e.g., vocal) segments 124 (step 2204).

Figure 25:
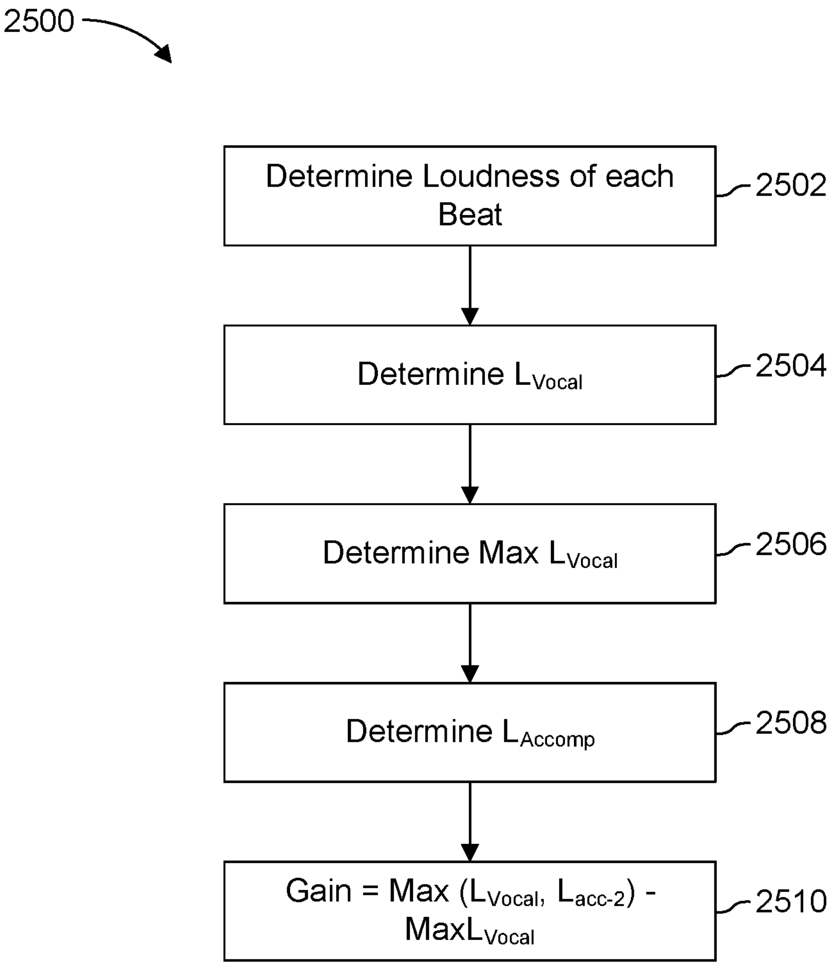
FIG. 25 shows a flow diagram of a procedure for determining a gain to be applied to a candidate track segment to be mixed with a query track, according to an example embodiment herein.

The particular gain (in dB) that is applied to a segment in step 2204 can depend on the type of the segment, according to an example embodiment herein. Preferably, for query segments 122 that have been assigned to S_keep, the original loudness thereof is maintained (i.e., the gain=1). For segments 122 assigned to S_subs and S_add, on the other hand, a loudness of beats of the tracks 110, 112 is employed and a heuristically determined value is used for a gain (in dB). FIG. 25 shows a procedure 2500 for determining a gain for segments 124 to be used in place of or to be added to query segments 122 assigned to S_subs and S_add, respectively. In step 2502 a loudness of each beat of tracks 110, 112 is determined, based on, for example, information 1131, wherein the loudness of each beat is determined as the mean loudness over the duration of the beat, in one example embodiment herein. Then, in step 2504, a determination is made of a median loudness (in dB) of each of the beats of the candidate segment 124 of the candidate track 110, wherein the median is represented by variable Lvocal. In step 2506 a determination is made of a maximum loudness (in dB) of each of the beats of the candidate segment 124 of the track 110, wherein the maximum loudness is represented by variable MaxLvocal. Then, in step 2508 a determination is made of a median loudness (in dB) of each beat of the segment 124, based on the query track 112, wherein that median loudness is represented by variable Laccomp. The determination is based on the separation of the vocals from the accompaniment track as seen 116 from FIG. 1. In step 2510 a determination is made of the gain to be applied to the particular segment 124, based on the following formula (F24):

$$\text{Gain}=\max(L\text{vocal},L\text{accomp}-2)-\text{Max }L\text{vocal} \quad \text{(F24).}$$

As a result of the "Gain" being determined for a particular candidate segment 124 (to be used in place of or to be added to a query segment 122 assigned to S_subs or S_add, respectively, in step 2510), that Gain is applied to the segment 124 in step 2204.

Figure 24:
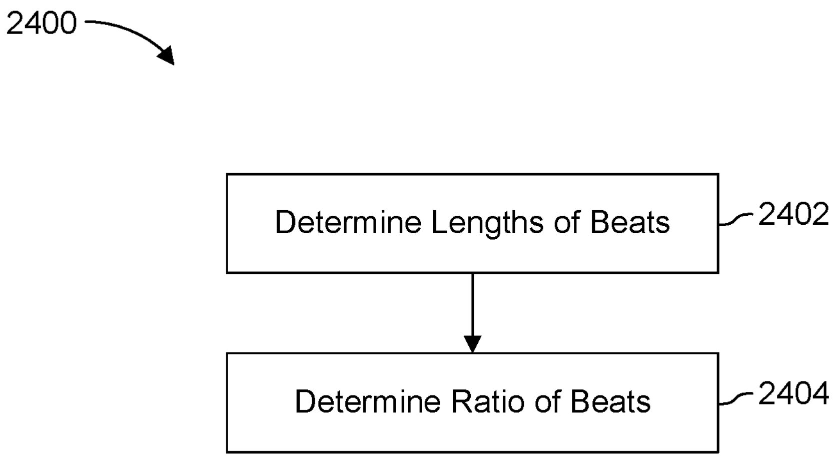
FIG. 24 shows a flow diagram of a procedure for performing time stretching, according to an example embodiment herein.

After step 2204, time-stretching is performed in step 2206. Preferably, time-stretching is performed to each beat of respective candidate (e.g., vocal) tracks 110 so that they conform to beats of the query track 112 under consideration, based on a time-stretching ratio (step 2206). In one example embodiment herein, the time-stretching ratio is determined according to procedure 2400 of FIG. 24. In step 2402 of procedure 2400, lengths of beats of the tracks 110, 112 under consideration are determined, based on, for example, information 1131. Then, in step 2404, for each beat of track 112, a time-stretching ratio is determined as a ratio of the length of that beat to the length of the corresponding beat of candidate track 110. Thus, in step 2206 of procedure 2200, for each beat of the candidate track 110, the length of the beat is varied based on the corresponding ratio determined for that beat in step 2404.

Step 2208 includes performing pitch shifting to each candidate (e.g., vocal) segment 124, as needed, based on a pitch-shifting ratio. In some embodiments, the pitch-shifting ratio is computed while computing the mashability scores discussed above. For example, the vocals are pitch-shifted by n_semitones, where n_semitones is the number of semitones. In some embodiments, the number of semitones is determined during example step 608 discussed in reference to FIG. 6.

Then, the procedure 2200 can include applying fade-in and fade-out, and/or high pass filtering or equalizations around transition points, using determined transitions (step 2210). In one example embodiment herein, the parts of each segment 124 (of a candidate track 110 under consideration) which are located temporally before initial and after the final points of the refined boundaries (i.e., transitions), can be rendered with a volume fade in, and a fade out, respectively, so as to perform a smooth intro and outro, and reduce clashes between vocals of different tracks. Fade in and Fade out can be performed in a manner known in the art. In another example embodiment herein, instead of performing a fade in step 2210, low pass filtering can be performed with a filter cutoff point that descends from, by example, 2 Khz, at a transition position until 0 Hz at the section initial boundary, in a logarithmic scale (i.e., where no filtering is performed at the boundary). Similarly, instead of performing a fade out in step 2210, a low pass filtering can be performed, with an increasing cutoff frequency, from, by example, 0 to 2 Khz, in logarithmic scale. Depending on the length of the transition (which depends on the refinement to avoid cutting vocal phrases), a faster or slower fade in or fade out can be provided (i.e., the longer the transition the slower the fade in or fade out). In some embodiments, the transition zone is the zone between the refined boundary using vocal activity detection and the boundary refined only with downbeat positions.

Referring again to FIG. 22, after step 2210 is performed, the segment(s) 124 to which steps 2202 to 2210 were performed are mixed (i.e., summed) with the corresponding segment(s) 122 of the query track 112 under consideration. By example, in a case where a segment 122 was previously assigned to S_subs, mixing can include replacing vocal content of that segment 122, with vocal content of the corresponding candidate segment 124 to which steps 2202 to 2210 were performed. Also by example, in a case where the segment 122 was previously assigned to S_add, mixing can include adding vocal content of the segment 124 to which steps 2202 to 2210 were performed, to the segment 122.

Personalization for Parallelization

Another example aspect herein will now be described. In accordance with this example aspect, an automashup can be personalized based on a user's personal taste profile. For example, users are more likely to enjoy mashups created from songs the users know and like. Accordingly, the present example aspect enables auto-mashups to be personalized to individual users' taste profiles. Also in accordance with this example aspect, depending on the application of interest, there may not be enough servers available to be able to adequately examine how every track might mash up with every other track, particularly in situations where a catalog many (e.g., millions) of tracks is involved. The present example aspect reduces the number of tracks that are searched for and considered/examined for possible mash-ups, thereby alleviating the number of servers and processing power required to perform mash-ups.

Figure 26:
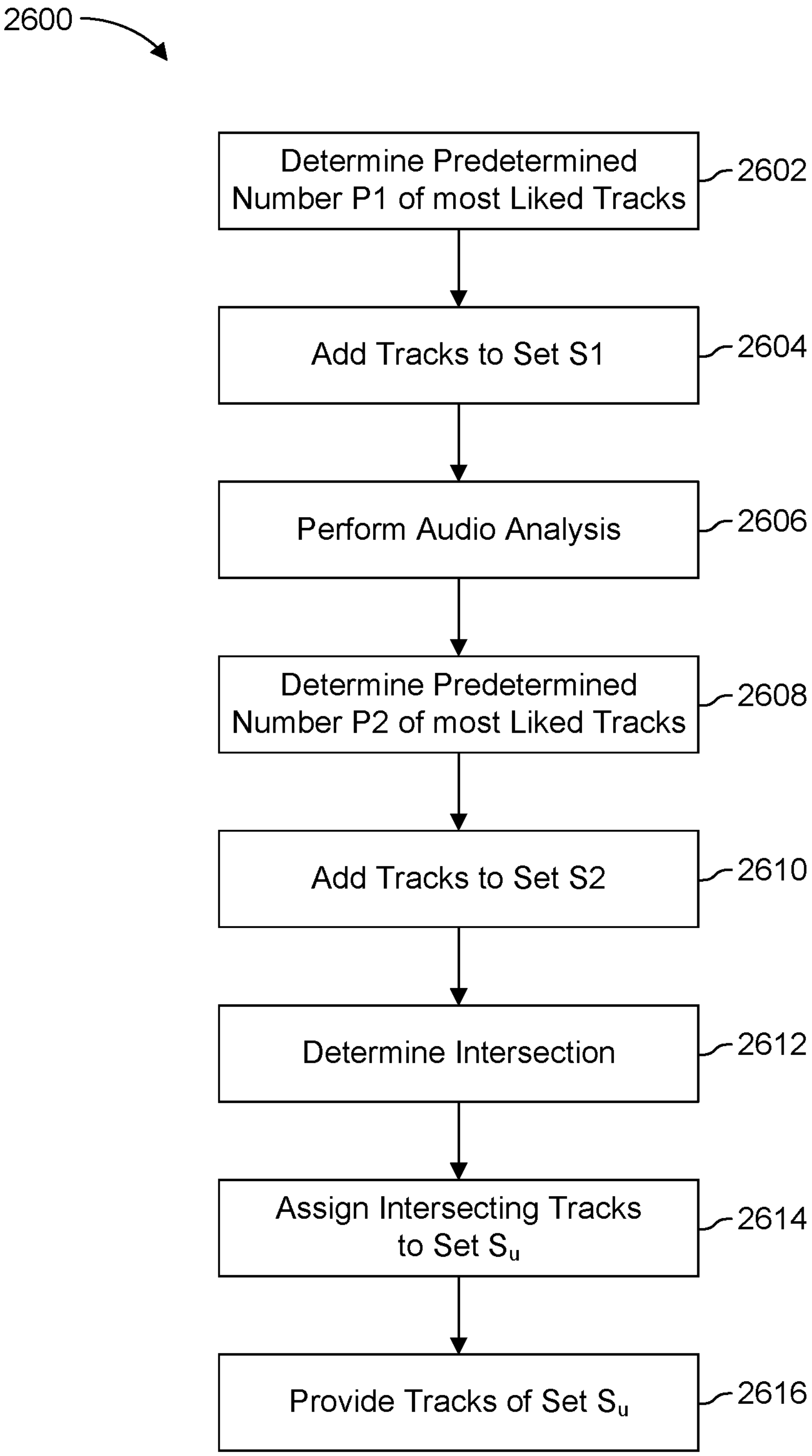
FIG. 26 shows a flow diagram of a procedure for identifying mashup candidate tracks based on user affinity data.

A procedure 2600 according to the present example aspect will now be described, with reference to the flow diagram shown in FIG. 26. In step 2602, a determination is made of a predetermined number P1 (e.g., 10) of most liked mixed, original tracks of at least some users of a mashup system herein, such as computation system 1100 to be described below. For example, the determination may be made with respect to all users of the system, with respect to only a certain set of users, with respect to only specific, predetermined users, and/or with respect to only users who prescribe to a specific service provided by the system. In one example embodiment herein, the determination in step 2602 is performed for each such user (i.e., for each such user, the predetermined number P1 of the user's most liked mixed, original tracks is determined). Also, in one example embodiment herein, the determination can be made by analyzing the listening histories of the users or user musical taste profiles.

Next, in step 2604, tracks that were determined in step 2602 are added to a set S1. In some example embodiments herein, there may be one set S1 for each user, or, in other example embodiments, there may be a single set S1 that includes all user tracks that were determined in step 2602. In the latter case, where there is overlap of tracks, only a single version of the track is included in the set S1, thereby reducing the number of tracks.

Then, in step 2606, audio analysis algorithms are performed to the tracks from set S1, and the resulting output(s) are stored as information 1131 in the database. In one example embodiment herein, the audio analysis performed in step 2606 includes determining the various types of information 1131 in the manner described above. By example only and without limitation, step 2606 may include separating components (e.g., vocal, instrumental, and the like) from the tracks, determining segmentation information based on the tracks, determining segment labelling information, performing track segmentation, determining the tempo(s) of the tracks, determining beat/downbeat positions in the tracks, determining the tonality of the tracks, determining information about the presence of vocals (if any) in time in each track, determining energy of each of the segments in the vocal and accompaniment tracks, determining acoustic feature vector information and loudness information (e.g., amplitude) associated with the tracks, and/or the like. In at least some cases, algorithms performed to determine at least some of the foregoing types of information can be expensive to run and may require a high level of processing power and resources. However, according to an example aspect herein, by reducing the total available number of tracks to only those included in the set S1, a reduction of costs, processing power, and resources can be achieved.

For each user for which the determination in step 2602 originally was made, a further determination is made in step 2608, of a predetermined number P2 (e.g., the top 100) of the respective user's most liked mixed, original tracks. In one example embodiment herein, the determination in step 2608 can be made by making affinity determinations for the respective users, in the above-described manner. Next, in step 2610, tracks that were determined in step 2608 are added to a set S2, wherein, in one example embodiment herein, there is set S2 for each user (although in other example embodiments, there may be a single set S2 that includes all user tracks that were determined in step 2608).

Then, in step 2612 an intersection of the tracks from the sets S1 and S2 is determined. In one example embodiment herein, step 2612 is performed to identify which tracks appear in both sets S1 and S2. According to an example embodiment herein, in a case where set S1 includes tracks determined in step 2602 for all users, and where each set S2 includes tracks determined in step 2608 for a respective one of the users, then step 2612 determines the intersection between tracks that are in the set S1 and the set S2, and is performed for each set S2 vis-a-vis the set S1. In an illustrative, non-limiting example in which the predetermined numbers P1 and P2 are 10 and 100, respectively, the performance of step 2612 results in there being between 10 and 100 tracks being identified per user in step 2612. The identified tracks for each respective user are then assigned to a corresponding set $S_U$ (step 2614).

Figure 27:
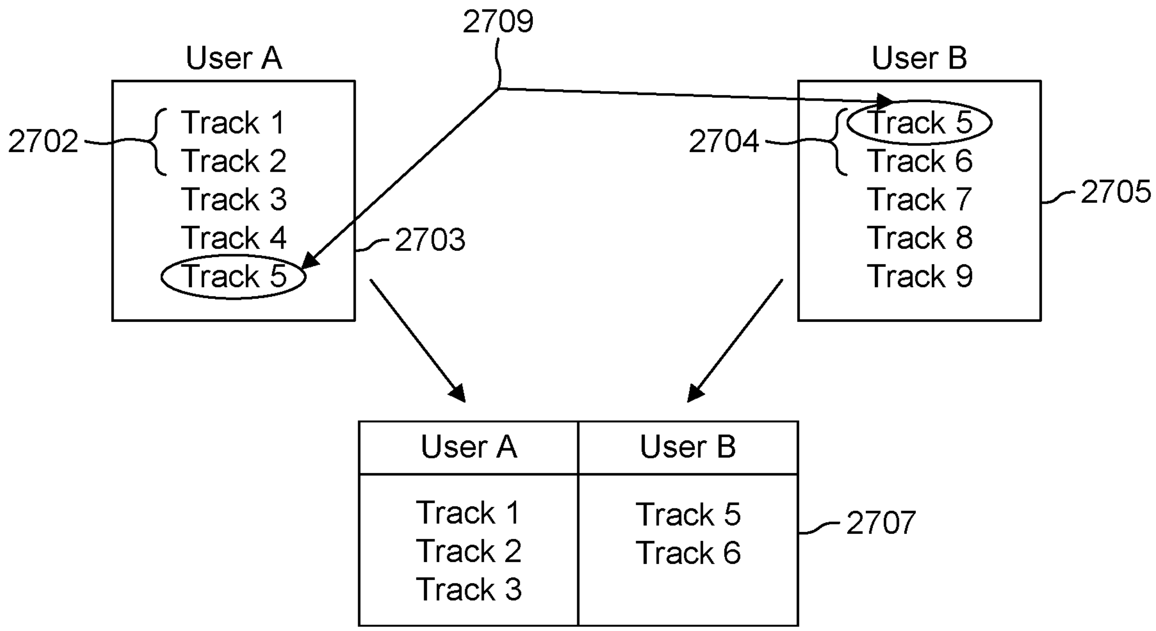
FIG. 27 shows a block diagram illustrating an example of the process shown in FIG. 26.

In another example embodiment herein, step 2612 is performed based on multiple users. By example and without limitation, referring to FIG. 27, it is assumed that a top predetermined number (e.g., two) of tracks 2702 are identified among mixed, original tracks 1-5, from a set 2703 associated with a user A (i.e., where the tracks 1-5 were identified as those for which User A has an affinity), and that a top predetermined number (e.g., two) of tracks 2704 are identified among mixed, original tracks 5-9 from a set 2705 associated with a user B (i.e., where the tracks 5-9 were identified as those for which User B has an affinity). In such an example case, step 2612 is performed to identify 2709 those tracks from the sets 2703 and 2705 that intersect or overlap (e.g., track 5) with one another, and to include the intersecting track in a set 2707. In one example embodiment herein, step 2612 also comprises including the tracks 2702 (e.g., tracks 1-2) from set 2703 (e.g., tracks 1-2) and a non-overlapping one (e.g., track 6) among the tracks 2704 from set 2705, in set 2707, wherein as represented in FIG. 27, track 1, track 2, and track 5 are shown in set 2707 in association with user A and track 5 and track 6 are shown in association with user B. Also in one example embodiment herein, the set 2707 may represent set $S_U$.

Referring again to FIG. 26, in one example aspect herein, a next step 2616 is performed by providing each track in the set $S_U$ (or per-user set $S_U$) to a waveform generation algorithm that generates a waveform based on at least one of the tracks, and/or to the song suggester algorithm described above. By example, a particular track from the set $S_U$ can be employed as the query track 112 in procedure 400 (FIG. 4) described above, and at least some other ones of the tracks from the set $S_U$ can be employed as the candidate tracks 110. In some example embodiments herein, each track of the set $S_U$ can be employed as a query track 112 in separate, respective iterations of the procedure 400, and other ones of the tracks from the set $S_U$ can be employed as corresponding candidate tracks 110 in such iterations. In another example embodiment herein, only those tracks of set $S_U$ that are not provided to the waveform generation algorithm, and which are associated with a particular user, are employed for use in the song suggester algorithm of procedure 400, resulting in a set of mashups of size $|S_U|$ mashing up various combinations of a particular user's most popular tracks.

In some example embodiments herein, the results of more than one user's affinity determinations (in procedure 2600) can be employed as mashup candidates, and musical compatibility determinations and possible resulting mashups can be performed for those tracks as well in the above-described manner, whether some tracks overlap across users or not. In still another example, only tracks for which a predetermined number of users are determined to have an affinity are employed in the musical compatibility determinations and possible mashups. In still another example where more than one user's affinity determinations are employed as mashup candidates, the intersection between those results and each user's full collection of tracks is determined and employed and the intersecting tracks are employed in musical compatibility determinations and possible mashups. At least some of the results of the intersection also can be employed to generate a waveform.

By virtue of the above procedure 2600, the number of tracks that are searched for and considered/examined for possible mash-ups can be reduced based on user profile(s), thereby alleviating the number of servers and processing power required to perform mash-ups.

Personalized Album Art

In accordance with another example embodiment herein, a collage can be created of images (e.g., album cover art) associated with musical tracks that are employed in a "mashup" of songs. In one example embodiment herein, each pixel of the collage is an album cover image associated with a corresponding musical track employed in a mashup, and the overall collage forms a profile photo of the user. A process according to this example aspect can include downloading a user's profile picture, and album art associated with various audio tracks, such as those used in mashups personalized for the user. Next, a resize is performed of every album art image to a single pixel. A next step includes obtaining the color (e.g., average color) of that pixel and placing it in a map of colors to the images they are associated with. This gives the dominant color of each piece of album art. Next steps include cropping the profile picture into a series of 20×20 pixels, and then performing a resize to one pixel on each of these cropped pictures, and then finding a nearest color in the map of album art colors. A next step includes replacing the cropped part of the picture with the album art resized to, by example only, 20×20 pixels. As a result, a collage of the album art images is provided, and, in one example embodiment herein, the collage forms a profile image of the user.

Track Name Generator

According to still another example embodiment herein, titles are formulated based on titles of songs that are mashed up. That is, titles of mashed up tracks are combined in order to create a new title that includes at least some words from the titles of the mashed up tracks. Prior to being combined, the words from each track title are categorized into different parts of speech using Natural Language Processing, such as by, for example, the Natural Language Toolkit (NLTK), which is a known collection of libraries and tools for natural language processing in Python. A custom derivation tree determines word order so that the combined track names are syntactically correct. Various possible combinations of words forming respective titles can be provided. In one example embodiment herein, out of all the possible combinations, the top 20% are selected based on length. The final track name is then randomly chosen from the 20%. The track names can then be uploaded to a data storage system (e.g., such as BigTable), along with other metadata for each track. From the data storage system, the track names can be retrieved and served in real-time along with the corresponding song mashups. In an illustrative example, the following (four) track titles T are employed as inputs: T={Shine on Me, I Feel Fantastic, Rolling Down the Hill, Wish You Were Here}. An algorithm according to an example embodiment herein selects the following words W from those titles T: W={shine, feel, fantastic, rolling, down, hill, wish, you, were, here}. Based on those words, the following possible combined titles are generated: "Wish the Hill," "The Shine was Rolling," and "The Fantastic Shine".

As can be appreciated in view of the above description, at least some example aspects herein employ source separation to generate candidate (e.g., vocal) tracks and query (e.g., accompaniment) tracks, although in other example embodiments, stems can be used instead, or a multitrack can be employed where separation is therefore not needed). In other example embodiments herein, full tracks can be employed (without separation of vocals and accompaniment components).

Also, at least some example aspects herein can determine which segments to keep of an original, mixed track, which ones to replace with content (e.g., vocal content) from other tracks, and which ones to have content from other tracks added thereto. For those segments in which vocals from other songs/tracks are added, it can be determined whether source (e.g., vocal) separation is needed to be performed or not on a query track (e.g., accompaniment track) by using vocal activity detection information, among information 1131.

At least some example embodiments herein also employ a song mashability score, using global song features, including, by example only, acoustic features derived from collaborative filtering knowledge. At least some example embodiments herein also employ a segment mashability score, including various types of musical features as described above.

At least some example embodiments herein also at least implicitly use collaborative filtering information (i.e., using acoustic feature vectors for improving recommendations of content (e.g., vocals) to be mixed with query (e.g., instrumental) tracks, and selection of content in contiguous segments. Presumably, the more similar they are, then the more likely it is for them to work well together in a mashup. However, this is a configurable parameter, and, in other examples, users may elect to foster mixes of more different songs, instead of more similar ones.

At least some example aspects herein also employ refinement of transitions between lead (vocal) parts, by using section, downbeat, and vocal activity detection for finding ideal transition points, in order to avoid detrimentally cutting melodic phrases.

Figure 20:
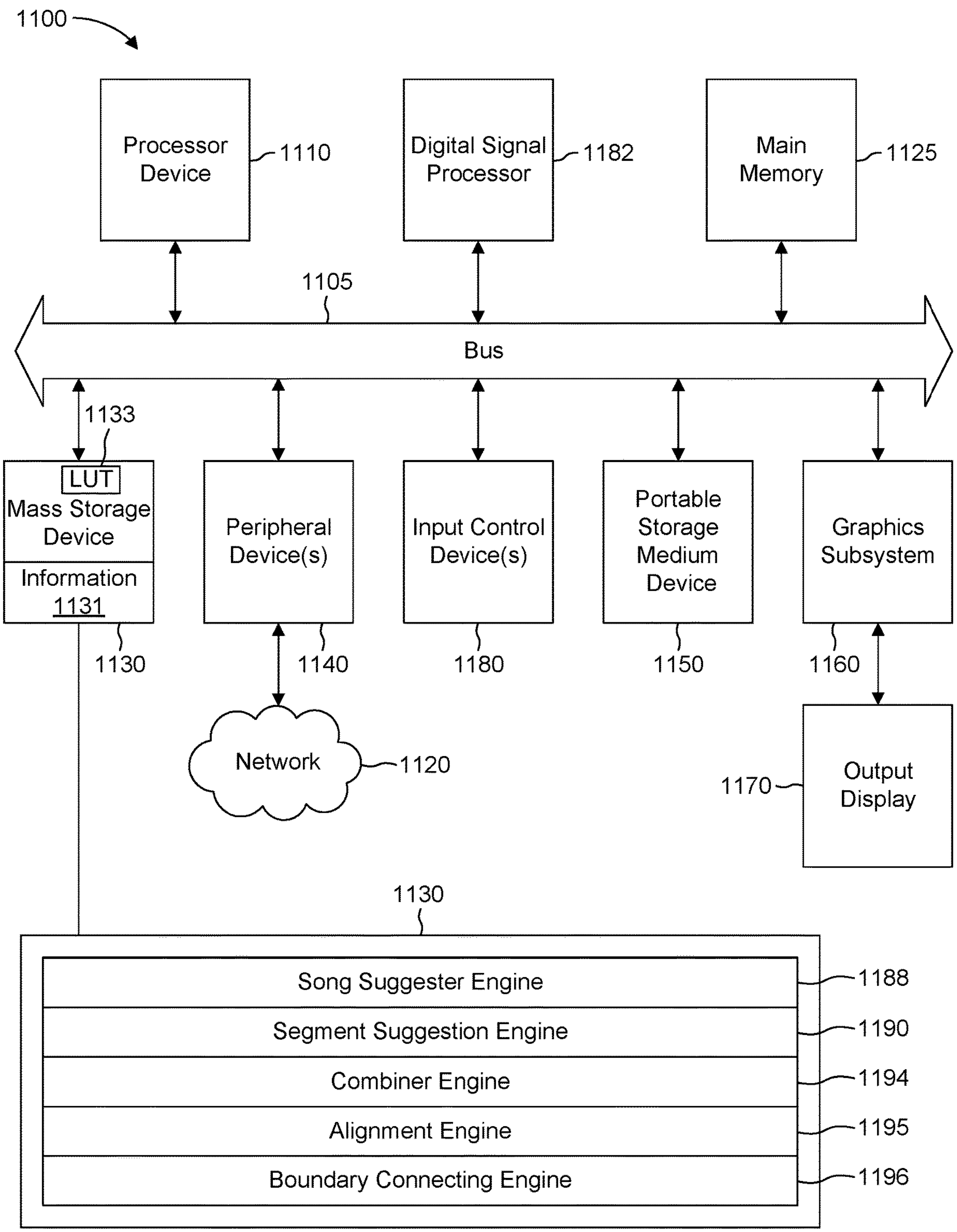
FIG. 20 illustrates a system for creating automashups, according to another example aspect herein.

FIG. 20 is a block diagram showing an example computation system 1100 constructed to realize the functionality of the example embodiments described herein.

The computation system 1100 may include without limitation a processor device 1110, a main memory 1125, and an interconnect bus 1105. The processor device 1110 (410) may include without limitation a single microprocessor, or may include a plurality of microprocessors for configuring the system 1100 as a multi-processor acoustic attribute computation system. The main memory 1125 stores, among other things, instructions and/or data for execution by the processor device 1110. The main memory 1125 may include banks of dynamic random access memory (DRAM), as well as cache memory.

The system 1100 may further include a mass storage device 1130 (which, in the illustrated embodiment, has LUT 1133 and stored information 1131), peripheral device(s) 1140, portable non-transitory storage medium device(s) 1150, input control device(s) 1180, a graphics subsystem 1160, and/or an output display interface 1170. A digital signal processor (DSP) 1182 may also be included to perform audio signal processing. For explanatory purposes, all components in the system 1100 are shown in FIG. 20 as being coupled via the bus 1105. However, the system 1100 is not so limited. Elements of the system 1100 may be coupled via one or more data transport means. For example, the processor device 1110, the digital signal processor 1182 and/or the main memory 1125 may be coupled via a local microprocessor bus. The mass storage device 1130, peripheral device(s) 1140, portable storage medium device(s) 1150, and/or graphics subsystem 1160 may be coupled via one or more input/output (I/O) buses. The mass storage device 1130 may be a nonvolatile storage device for storing data and/or instructions for use by the processor device 1110. The mass storage device 1130 may be implemented, for example, with a magnetic disk drive or an optical disk drive. In a software embodiment, the mass storage device 1130 is configured for loading contents of the mass storage device 1130 into the main memory 1125.

Mass storage device 1130 additionally stores a song suggester engine 1188 that can determine musical compatibility between different musical tracks, a segment suggestion engine 1190 that can determine musical compatibility between segments of the musical tracks, a combiner engine 1194 that mixes or mashes up musically compatible tracks and segments, an alignment engine 1195 that aligns segments to be mixed/mashed up, and a boundary connecting engine 1196 that refines boundaries of such segments.

The portable storage medium device 1150 operates in conjunction with a nonvolatile portable storage medium, such as, for example, a solid state drive (SSD), to input and output data and code to and from the system 1100. In some embodiments, the software for storing information may be stored on a portable storage medium, and may be inputted into the system 1100 via the portable storage medium device 1150. The peripheral device(s) 1140 may include any type of computer support device, such as, for example, an input/output (I/O) interface configured to add additional functionality to the system 1100. For example, the peripheral device(s) 1140 may include a network interface card for interfacing the system 1100 with a network 1120.

The input control device(s) 1180 provide a portion of the user interface for a user of the computer 1100. The input control device(s) 1180 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 1100 may include the graphics subsystem 1160 and the output display 1170. The output display 1170 may include a display such as a CSTN (Color Super Twisted Nematic), TFT (Thin Film Transistor), TFD (Thin Film Diode), OLED (Organic Light-Emitting Diode), AMOLED display (Activematrix Organic Light-emitting Diode), and/or liquid crystal display (LCD)-type displays. The displays can also be touchscreen displays, such as capacitive and resistive-type touchscreen displays. The graphics subsystem 1160 receives textual and graphical information, and processes the information for output to the output display 1170.

Figure 19:
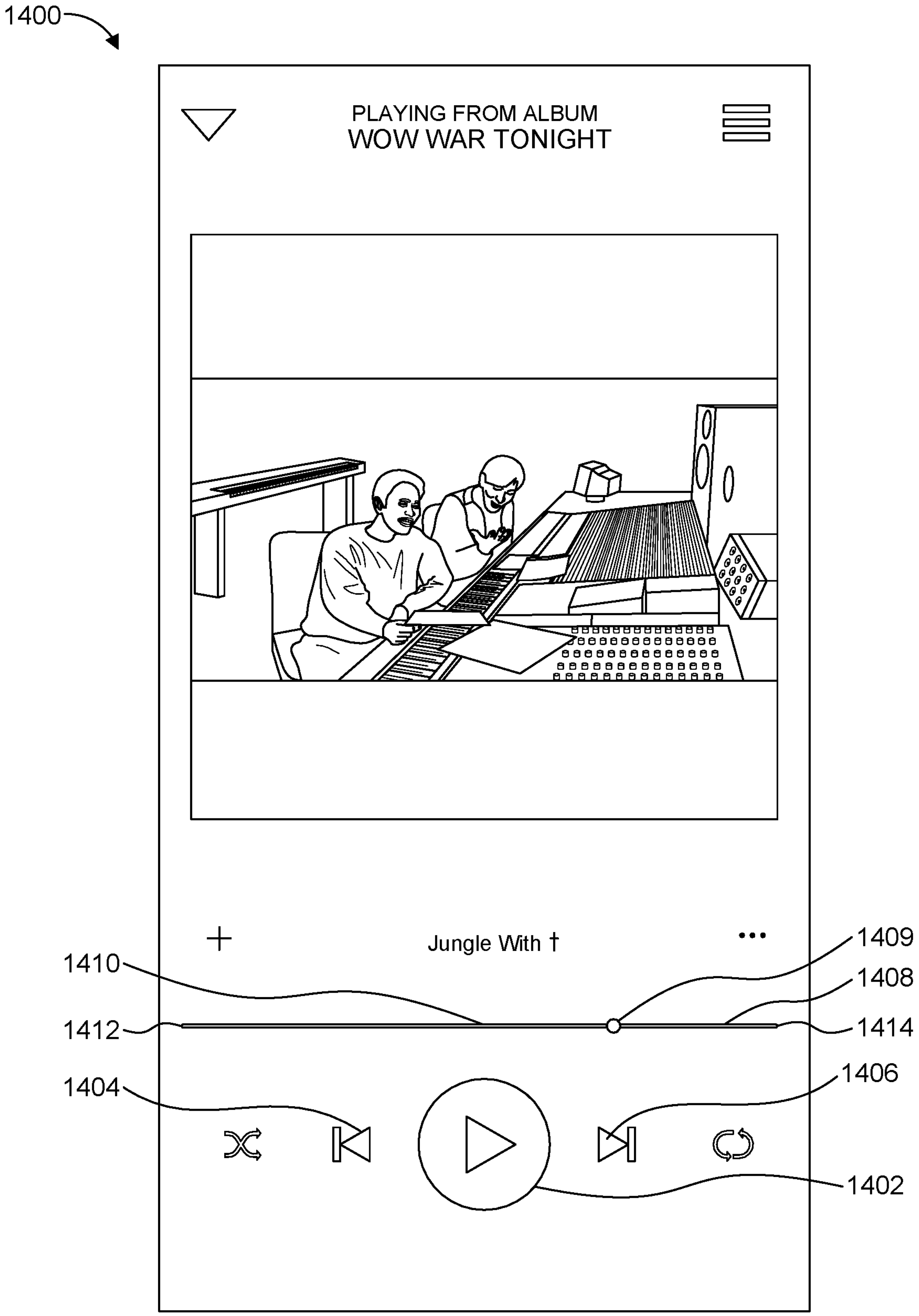
FIG. 19 shows a user interface including a volume control bar and a volume control according to an example embodiment herein.

FIG. 19 shows an example of a user interface 1400, which can be provided by way of the output display 1170 of FIG. 20, according to a further example aspect herein. The user interface 1400 includes a play button 1402 selectable for playing tracks, such as tracks stored in mass storage device 1130, for example. Tracks stored in the mass storage device 1130 may include, by example, tracks having both vocal and non-vocal (instrumental) components (i.e., mixed signals), tracks including only instrumental or vocal components (i.e., instrumental or vocal tracks, respectively), query tracks, candidate tracks, etc.

The user interface 1400 also includes forward control 1406 and reverse control 1404 for scrolling through a track in either respective direction, temporally. According to an example aspect herein, the user interface 1400 further includes a volume control bar 1408 having a volume control 1409 (also referred to herein as a "karaoke slider") that is operable by a user for attenuating the volume of at least one track. By example, assume that the play button 1402 is selected to playback a song called "Night". According to one non-limiting example aspect herein, when the play button 1402 is selected, the "mixed" original track of the song, and the corresponding instrumental track of the same song (i.e., wherein the tracks may be identified as being a pair according to procedures described above), are retrieved from the mass storage device 1130. As a result, both tracks are simultaneously played back to the user, in synchrony. In a case where the volume control 1409 is centered at position 1410 in the volume control bar 1408, then, according to one example embodiment herein, the "mixed" original track and instrumental track both play at 50% of a predetermined maximum volume. Adjustment of the volume control 1409 in either direction along the volume control bar 1408 enables the volumes of the simultaneously played back tracks to be adjusted in inverse proportion, wherein, according to one example embodiment herein, the more the volume control 1409 is moved in a leftward direction along the bar 1408, the lesser is the volume of the instrumental track and the greater is the volume of the "mixed" original track. For example, when the volume control 1409 is positioned precisely in the middle between a leftmost end 1412 and the center 1410 of the volume control bar 1408, then the volume of the "mixed" original track is played back at 75% of the predetermined maximum volume, and the instrumental track is played back at 25% of the predetermined maximum volume. When the volume control 1409 is positioned all the way to the left end 1412 of the bar 1408, then the volume of the "mixed" original track is played back at 100% of the predetermined maximum volume, and the instrumental track is played back at 0% of the predetermined maximum volume.

Also according to one example embodiment herein, the more the volume control 1409 is moved in a rightward direction along the bar 1408, the greater is the volume of the instrumental track and the lesser is the volume of the "mixed" original track. By example, when the volume control 1409 is positioned precisely in the middle between the center positon 1410 and rightmost end 1414 of the bar 1408, then the volume of the "mixed" original track is played back at 25% of the predetermined maximum volume, and the instrumental track is played back at 75% of the predetermined maximum volume. When the volume control 1409 is positioned all the way to the right along the bar 1408, at the rightmost end 1414, then the volume of the "mixed" original track is played back at 0% of the predetermined maximum volume, and the instrumental track is played back at 100% of the predetermined maximum volume.

In the above manner, a user can control the proportion of the volume levels between the "mixed" original track and the corresponding instrumental track.

Of course, the above example is non-limiting. By example, according to another example embodiment herein, when the play button 1402 is selected, the "mixed" original track of the song, as well as the vocal track of the same song (i.e., wherein the tracks may be identified as being a pair according to procedures described above), can be retrieved from the mass storage device 1130, wherein, in one example, the vocal track is obtained according to one or more procedures described above, such as that shown in FIG. 4, or is otherwise available. As a result, both tracks are simultaneously played back to the user, in synchrony. Adjustment of the volume control 1409 in either direction along the volume control bar 1408 enables the volume of the simultaneously played tracks to be adjusted in inverse proportion, wherein, according to one example embodiment herein, the more the volume control 1409 is moved in a leftward direction along the bar 1408, the lesser is the volume of the vocal track and the greater is the volume of the "mixed" original track, and, conversely, the more the volume control 1409 is moved in a rightward direction along the bar 1408, the greater is the volume of the vocal track and the lesser is the volume of the "mixed" original track.

In still another example embodiment herein, when the play button 1402 is selected to play back a song, the instrumental track of the song, as well as the vocal track of the same song (wherein the tracks are recognized to be a pair) are retrieved from the mass storage device 1130. As a result, both tracks are simultaneously played back to the user, in synchrony. Adjustment of the volume control 1409 in either direction along the volume control bar 1408 enables the volume of the simultaneously played tracks to be adjusted in inverse proportion, wherein, according to one example embodiment herein, the more the volume control 1409 is moved in a leftward direction along the bar 1408, the lesser is the volume of the vocal track and the greater is the volume of the instrumental track, and, conversely, the more the volume control 1409 is moved in a rightward direction along the bar 1408, the greater is the volume of the vocal track and the lesser is the volume of the instrumental track.

Of course, the above-described directionalities of the volume control 1409 are merely representative in nature, and, in other example embodiments herein, movement of the volume control 1409 in a particular direction can control the volumes of the above-described tracks in an opposite manner than those described above, and/or the percentages described above may be different that those described above, in other example embodiments. Also, in one example embodiment herein, which particular type of combination of tracks (i.e., a mixed original signal paired with either a vocal or instrumental track, or paired vocal and instrumental tracks) is employed in the volume control technique described above can be predetermined according to pre-programming in the system 1100, or can be specified by the user by operating the user interface 1400.

Referring again to FIG. 20, the input control devices 1180 will now be described.

Input control devices 1180 can control the operation and various functions of system 1100.

Input control devices 1180 can include any components, circuitry, or logic operative to drive the functionality of system 1100. For example, input control device(s) 1180 can include one or more processors acting under the control of an application.

Each component of system 1100 may represent a broad category of a computer component of a general and/or special purpose computer. Components of the system 1100 (400) are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described herein.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIG. 20 is presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for combining audio tracks, the system comprising:

a memory storing a computer program; and a computer processor, controllable by the computer program to:

determine at least one music track from a plurality of music tracks that is musically compatible with a base music track by determining respective cosine distances between an acoustic feature vector of the base music track and an acoustic feature vector of each of the plurality of music tracks;

align the at least one music track and the base music track;

separate the at least one music track into an accompaniment component and a vocal component; and add the vocal component of the at least one music track to the base music track.

2. The system of claim 1, wherein to determine the at least one music track from the plurality of music tracks includes to determine at least one segment of the at least one music track that is musically compatible with at least one segment of the base music track.

3. The system of claim 1, wherein the base music track and the at least one music track are music tracks of different songs.

4. The system of claim 1, wherein the computer processor is further controllable by the computer program to:

transform a musical key of the base music track and a corresponding musical key of the at least one music track, so that keys of the base music track and the corresponding musical key of the at least one music track are compatible.

5. The system of claim 1, wherein the computer processor is further controllable by the computer program to:

identify music tracks for which a plurality of users have an affinity; and identify those ones of the identified music tracks for which one of the plurality of users has an affinity, wherein at least one of the identified music tracks for which one of the plurality of users has an affinity is used as the base music track.

6. The system of claim 5, wherein at least another one of the identified music tracks for which one of the plurality of users has an affinity is used as the at least one music track.

7. The system of claim 1, wherein to determine the at least one music track from the plurality of music tracks includes to determine at least one of a vertical musical compatibility between segments of the base music track and the at least one music track, or a horizontal musical compatibility among tracks.

8. The system of claim 7, wherein the vertical musical compatibility is based on at least one of a tempo compatibility, a harmonic compatibility, a loudness compatibility, vocal activity, beat stability, or a segment length.

9. The system of claim 7, wherein to determine the horizontal musical compatibility includes to determine at least one of a distance between acoustic feature vectors among the plurality of music tracks, and a repetition of a segment of one of the plurality of music tracks being selected as a candidate for being mixed with the base music track.

10. The system of claim 7, wherein to determine the at least one music track from the plurality of music tracks further includes to determine a compatibility score based on a key distance score associated with at least one of the tracks, an acoustic feature vector distance associated with at least one of the tracks, the vertical musical compatibility, and the horizontal musical compatibility.

11. A method for combining audio tracks, comprising:

determining at least one music track from a plurality of music tracks that is musically compatible with a base music track by determining respective cosine distances between an acoustic feature vector of the base music track and an acoustic feature vector of each of the plurality of music tracks;

aligning the at least one music track and the base music track;

separating the at least one music track into an accompaniment component and a vocal component; and adding the vocal component of the at least one music track to the base music track.

12. The method of claim 11, wherein determining the at least one music track from the plurality of music tracks includes determining at least one segment of the at least one music track that is musically compatible with at least one segment of the base music track.

13. The method of claim 11, wherein the base music track and the at least one music track are music tracks of different songs.

14. The method of claim 11, further comprising determining whether to keep a vocal component of the base music track, or replace the vocal component of the base music track with the vocal component of the at least one music track before adding the vocal component of the at least one music track to the base music track.

15. The method of claim 11, further comprising:

identifying music tracks for which a plurality of users have an affinity; and identifying those ones of the identified music tracks for which one of the plurality of users has an affinity, wherein at least one of the identified music tracks for which one of the plurality of users has an affinity is used as the base music track.

16. The method of claim 15, wherein at least another one of the identified music tracks for which one of the plurality of users has an affinity is used as the at least one music track.

17. The method of claim 11, wherein determining the at least one music track from the plurality of music tracks includes calculating a respective musical compatibility score between the base music track and each of the plurality of music tracks.

18. The method of claim 11, wherein determining the at least one music track from the plurality of music tracks includes determining at least one of: a vertical musical compatibility between segments of the base music track and the at least one music track, and a horizontal musical compatibility among tracks.

19. The method of claim 18, wherein the vertical musical compatibility is based on at least one of a tempo compatibility, a harmonic compatibility, a loudness compatibility, vocal activity, beat stability, or a segment length.

20. A system for combining audio tracks, the system comprising:

a memory storing a computer program; and a computer processor, controllable by the computer program to:

determine a first segment of at least one music track from a plurality of music tracks that is musically compatible with a second segment of a base music track by determining respective cosine distances between an acoustic feature vector of the second segment of the base music track and acoustic feature vectors of segments of the plurality of music tracks;

align the first segment of the at least one music track and the second segment of the base music track;

separate the first segment of the at least one music track into an accompaniment component and a vocal component; and add the vocal component of the first segment of the at least one music track to the second segment of the base music track.

* * * * *